US007678745B2

(12) United States Patent
Parris et al.

(10) Patent No.: US 7,678,745 B2
(45) Date of Patent: Mar. 16, 2010

(54) VISCOSITY REDUCTION

(75) Inventors: Michael D. Parris, Richmond, TX (US);
Andrey Mirakyan, Houston, TX (US);
Yiyan Chen, Sugar Land, TX (US);
Carlos Abad, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/212,339

(22) Filed: Sep. 17, 2008

(65) Prior Publication Data
US 2009/0082228 A1 Mar. 26, 2009

Related U.S. Application Data

(60) Provisional application No. 60/974,672, filed on Sep. 24, 2007.

(51) Int. Cl.
*C09K 8/68* (2006.01)
(52) U.S. Cl. ...................... 507/211; 166/300
(58) Field of Classification Search ........... 507/269, 507/211; 166/300
See application file for complete search history.

(56) References Cited

U.S. PATENT DOCUMENTS

| | | | |
|---|---|---|---|
| 3,692,676 | A | 9/1972 | Culter et al. |
| 3,922,173 | A | 11/1975 | Misak et al. |
| 3,937,283 | A | 2/1976 | Blauer et al. |
| 4,199,484 | A | 4/1980 | Murphey |
| 4,368,136 | A | 1/1983 | Murphey |
| 5,175,278 | A | 12/1992 | Peik et al. |
| 5,447,199 | A * | 9/1995 | Dawson et al. ............ 166/300 |
| 5,607,905 | A | 3/1997 | Dobson et al. |
| 5,688,844 | A | 11/1997 | Chatterji et al. |
| 5,782,300 | A | 7/1998 | James et al. |
| 5,783,527 | A | 7/1998 | Dobson et al. |
| 5,806,597 | A | 9/1998 | Tjon-Joe-Pin et al. |
| 6,110,271 | A | 8/2000 | Skaggs et al. |
| 6,131,661 | A | 10/2000 | Conner et al. |
| 6,138,760 | A | 10/2000 | Lopez et al. |
| 6,143,698 | A | 11/2000 | Murphey et al. |
| 6,221,152 | B1 | 4/2001 | Dial et al. |
| 6,227,295 | B1 | 5/2001 | Mitchell et al. |
| 6,482,866 | B1 | 11/2002 | Dahayanake et al. |
| 6,599,863 | B1 | 7/2003 | Palmer et al. |
| 6,620,775 | B2 | 9/2003 | Winston et al. |
| 6,703,352 | B2 | 3/2004 | Dahayanake et al. |
| 6,720,290 | B2 | 4/2004 | England et al. |
| 6,924,254 | B2 | 8/2005 | Todd et al. |
| 6,938,693 | B2 | 9/2005 | Boney et al. |
| 7,090,015 | B2 | 8/2006 | Todd et al. |
| 7,174,960 | B2 | 2/2007 | Weaver et al. |
| 2003/0100460 | A1 | 5/2003 | Winston et al. |
| 2004/0121932 | A1 | 6/2004 | Griese et al. |
| 2005/0261138 | A1 | 11/2005 | Robb et al. |
| 2007/0078063 | A1 * | 4/2007 | Munoz, Jr. .................. 507/110 |
| 2008/0305971 | A1 * | 12/2008 | Li et al. .................... 507/90 |

FOREIGN PATENT DOCUMENTS

| | | |
|---|---|---|
| EP | 0 209 277 | 4/1990 |
| WO | 9722564 | 6/1997 |

OTHER PUBLICATIONS

Pollock, T.J., Sphingan Group of Exopolysaccharides (EPS), in Biopolymers, vol. 5, E.J. Vandamme, S. DeBaets, and A. Steinbuuchel, Editors. 2002, Wiley-VCH Verlag GmbH. p. 239-258.
Kuo, M.S., A.J. Mort, and A. Dell, Identification and location of L-glycerate, an unusual acyl substituent in gellan gum. Carbohydrate Research, 1986. 156: p. 173-187.
Stankowski, J.D. And S.G. Zeller, Location of the O-acetyl group in welan by the reductive-cleavage method. Carbohydrate Research, 1992. 224: p. 337-341.
Chowdhury, T.A., et al., Structural studies of an extracellular polysaccharide, S-657, elaborated by Xanthomonas ATCC 53159. Carbohydrate Research, 1987. 164: p. 117-122.
Jansson, P.E., et al., Structural studies of a polysaccharide (S-194) elaborated by Alcaligenes ATCC 31961. Carbohydrate Research, 1986. 156: p. 157-163.
Jannson, P.E., N.S. Kumar, and B. Lindberg, Structural studies of a polysaccharide (S-88) elaborated by Pseudomonas ATCC 31554. Carbohydrate Research, 1986. 156: p. 165-172.
Chowdhury, T.A., B. Lindberg, and U. Lindquist, Structural studies of an extracellular polysaccharide (S-198) elaborated by Alcaligenes ATCC 31853. Carbohydrate Research, 1987. 161: p. 127-132.
Diltz, S, and S.G. Zeller, Location of O-acetyl groups in S-657 using the reductive-cleavage method. Carbohydrate Research, 2001. 331: p. 265-270.
SPE 80242—A Circulating Foam Loop for Evaluating Foam at Conditions of Use By Richard D. Hutchins, Matthew J. Miller.
IADC SPE 62790—R.C. Navarrete et al., New Bio-Polymers for Drilling, Drill In, Completions, Spacer Fluids and Coiled Tubing Applications—presented at the 2000 IADC/SPE Asia Pacific Drilling Technology in Kuala Lumpur, Malaysia, Sep. 11-13, 2000.

* cited by examiner

*Primary Examiner*—Timothy J. Kugel
*Assistant Examiner*—Atnaf Admasu
(74) *Attorney, Agent, or Firm*—Rachel Greene; David Cate; Robin Nava

(57) ABSTRACT

A well treatment fluid and method uses an organic peroxide. An activator embodiment can lower an effective concentration of the peroxide to break the fluid. A weight ratio of activator:organic peroxide can be at least about 1:20 in one well treatment fluid embodiment. A peroxyester breaker embodiment can be used in a well treatment fluid and method. A breaker delay agent embodiment can control the polymer break window in a well treatment fluid and method using an organic peroxide. A breaker package embodiment used in a well treatment fluid and method can include an organic peroxide and an amine breaker delay agent having the formula $RR^1NR^2$ wherein R, $R^1$ and $R^2$ are independently selected from hydrogen, alkyl, hydroxyalkyl, and combinations thereof.

33 Claims, 8 Drawing Sheets

VISCOSITY REDUCTION

CROSS REFERENCE TO RELATED APPLICATION

This application claims the benefit of and priority to U.S. 60/974,672, filed Sep. 24, 2007.

BACKGROUND OF THE INVENTION

The statements in this section merely provide background information related to the present disclosure and may not constitute prior art. Embodiments of this invention relate to compositions and methods used in treating a well, a subterranean formation penetrated by the well, or the like. In particular, embodiments relate to the viscosity reduction of polymer gels after use in hydraulic fracturing, sand control, workover operations, and the like. In particular, embodiments provide peroxide means to reduce the viscosity by reducing the molecular weight of the polymer, whether or not the polymer is crosslinked.

Hydraulic fracturing is a process for stimulating oil and gas wells by pumping gel-proppant slurries at high pressure into producing rock layers. Once the rock is cracked, the resulting fracture is propped open by the sand or other proppant carried by the slurry. This fracture serves as a highly conductive path for the oil or gas, and therefore increases the effective wellbore radius. Fluid viscosity can facilitate effective proppant placement during fracturing operations. Polysaccharides such as guar and guar derivatives have served as common viscosifying polymers. They are often crosslinked using borates or metallic crosslinkers such as zirconium and titanium to generate even higher viscosity.

Once a particular subterranean formation treatment operation is essentially complete, it generally becomes necessary to break, i.e. substantially reduce, the viscosity of the fluid, such as a polymer gel, by reducing the molecular weight of the polymer network forming the gel. This industry uses a variety of compounds to break the viscosity of fluids, including those defined in the broad categories of oxidizers and enzymes. The break mechanisms involved are generally complex, and poorly understood, and therefore breakers are oftentimes not adequately effective or easily usable. Control over the timing of viscosity reduction is highly desirable in subterranean treatment operations. Factors such as pump time, shut-in time, and wait time for workover fluids, drive the need to control the rate of breaking the viscosity.

Background references include: U.S. Pat. No. 5,447,199 disclosing controlled degradation of polymer based aqueous gels; U.S. Pat. No. 6,924,254 disclosing viscous well treating fluids and methods using a delayed viscosity breaker comprising pentanedione peroxide; U.S. Pat. No. 6,489,282 disclosing bleaching compositions comprising a peroxy carboxylic acid and a polymer system; LUPEROX® Organic Peroxides Peroxyesters Product Bulletin (2005); and LUPEROX® Organic Peroxides General Catalog—Americas (2004).

SUMMARY OF THE INVENTION

In one embodiment, the invention relates to a well treatment fluid and method wherein an organic peroxide is used with an activator to lower an effective concentration of the peroxide to break the fluid. In an embodiment, a weight ratio of the activator:organic peroxide can be at least about 1:20. In an embodiment, an optional delay agent controls the fluid break window.

In another embodiment, the invention relates to a peroxyester breaker used in a well treatment fluid and method. In an embodiment, the peroxyester breaker includes an optional activator, optional delay agent or combination thereof.

In another embodiment, the invention relates to a well treatment fluid and method wherein a breaker delay agent can control the polymer break window for a peroxide beaker package. In an embodiment, the peroxide breaker package can include an optional activator.

In another embodiment, the invention relates to a well treatment fluid and method wherein a breaker package comprises an organic peroxide, and an amine breaker delay agent having the formula $RR^1NR^2$ wherein R, $R^1$ and $R^2$ are independently selected from hydrogen, alkyl, hydroxyalkyl, and combinations thereof. In an embodiment, the breaker package can include an optional activator.

DESCRIPTION OF THE INVENTION

Figure 1:
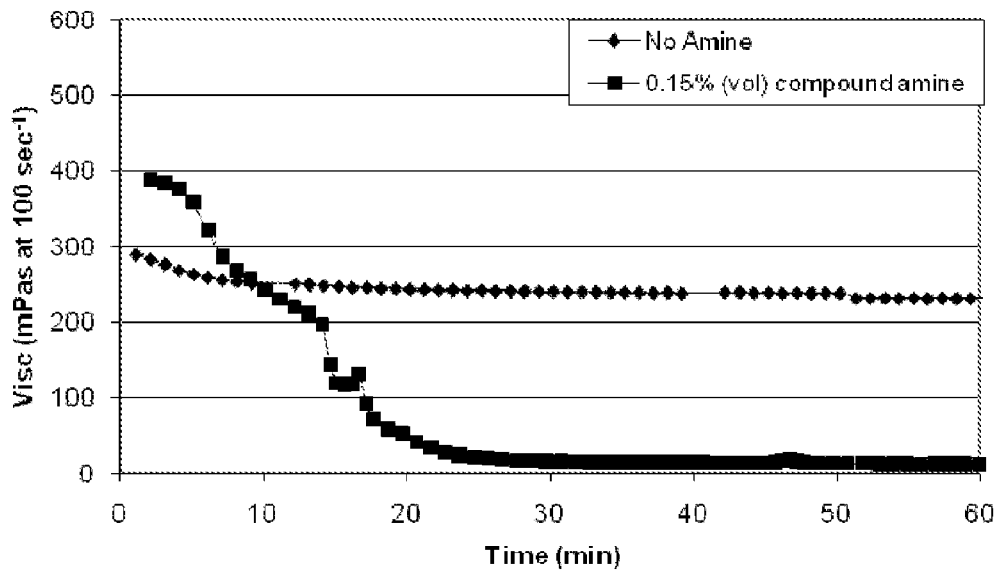
FIG. 1 shows rheometry curves at 80° C. for 0.96 weight percent carboxymethylhydroxypropyl guar (CMHPG) and 42 ppm t-butyl hydroperoxide with and without 0.15 volume percent tetraethylenepentamine (TEPA) as described in Example 1, and demonstrates that TEPA can activate fluid viscosity breaking of low concentration peroxides according to an embodiment of the invention.

The description and examples merely illustrate some of the different embodiments and are not intended as a limitation to the scope and applicability. While the compositions and methods in various embodiments relate to certain component materials, the components could optionally comprise two or more chemically different materials. In addition, the composition can also comprise some components other than the ones already cited. In the summary of the invention and this description, each numerical value should be read once as modified by the term "about" (unless already expressly so modified), and then read again as not so modified unless otherwise indicated in context. Also, in the summary of the invention and this detailed description, it should be understood that a range, such as a concentration range, listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even if no data points within the range are explicitly identified or refer to only a few specific data points, it is to be understood that inventors appreciate and understand that any and all data points within the range are to be considered to have been specified. Further; the inventors are in possession of the entire range and all points within the range.

Some selected embodiments of the invention relate to the following:

A. An aqueous well treatment fluid comprising a viscosifying polymer and a breaker package comprising an organic peroxide and an activator to lower an effective concentration of the peroxide to break the fluid, wherein the beaker package may further optionally comprise a delay agent;

B. A well treatment method comprising introducing an aqueous treatment fluid comprising a viscosifying polymer into the well, and contacting the fluid with a breaker package comprising an organic peroxide and an activator to lower an effective concentration of the peroxide to break the fluid, wherein the beaker package may further optionally comprise a delay agent;

C. A well treatment method, comprising introducing an aqueous treatment fluid comprising a viscosifying polymer into the well, and contacting the polymer with a combination thereof;

D. A well treatment method comprising designing a well treatment job with a specified window to break an aqueous treatment fluid, wherein the aqueous treatment fluid comprises a viscosifying polymer, an organic peroxide breaker and a delay agent to controllably delay the breaker, optionally with an activator, adjusting a proportion of the peroxide, delay agent or combination thereof in the treatment fluid to control the polymer break window to match the specified break window, and introducing the aqueous treatment fluid into the well according to the treatment job design;

E. A well treatment method comprising introducing an aqueous treatment fluid comprising a viscosifying polymer into the well, and contacting the polymer with a breaker package comprising an organic peroxide and a breaker delay agent, wherein the delay agent has the formula $RR^1NR^2$ wherein R, $R^1$, and $R^2$ are independently selected from hydrogen, alkyl, hydroxyalkyl, and combinations thereof, wherein the beaker package may further optionally comprise an activator;

F. Any one of the embodiments A through E wherein a weight ratio of the activator:organic peroxide can be at least about 1:20, or from about 1:1 to about 20:1;

G. Any one of the embodiments A through F wherein the polymer is crosslinked;

H. Any one of the embodiments A through F wherein the polymer is non-crosslinked;

I. Any one of the embodiments A through H wherein the polymer comprises polysaccharide;

J. Any one of the embodiments A through I wherein the polymer comprises a water soluble synthetic polymer;

K. Any one of the embodiments A through J wherein the organic peroxide is present at an effective concentration from about 1 to about 1000 ppm by weight of water in the treatment fluid;

L. Any one of the embodiments A, B, D, E, and F through K (as related to embodiments A, B, D or E) wherein the organic peroxide is selected from the group consisting of diacyl peroxides, dialkyl peroxides, diperoxyketals, hydroperoxides, peroxydicarbonates, peroxyesters and combinations thereof, M. Any one of the embodiments A, B, D, E, and F through L (as related to embodiments A, B, D or E) wherein the organic peroxide comprises a peroxyester;

N. Any one of the embodiments A through M wherein the organic peroxide is selected from the group consisting of t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids, OO-t-alkyl O-alkyl diesters of monoperoxycarbonic acids and combinations thereof;

O. Any one the embodiments A through N wherein the organic peroxide comprises t-butyl peroxybenzoate;

P. Any one of the embodiments A through O wherein the organic peroxide is supported on a finely divided solid and slurried in the treatment fluid;

Q. Any one the embodiments A through P wherein the activator comprises a polyamine according to the chemical formula $R^3R^4N((CR^5R^6)_2—NR^7)_n—R^8$ wherein n is at least 2, from 2 to 12, from 2 to 8, or from 3 to 8, and wherein $R^3$, $R^4$, $R^5$, $R^6$, $R^7$ and $R^8$ are independently selected from hydrogen, alkyl, hydroxyalkyl, and combinations thereof, S. Any one of the embodiments A through Q wherein the activator is selected from triethylenetetramine, tetraethylenepentamine, pentaethylenehexamine, N-methyl aniline, N,N-dimethyl aniline and combinations thereof. Any one of the embodiments A through R wherein the breaker package comprises an onset delay agent;

T. Any one of the embodiments A through S wherein the breaker package comprises an amine compound of the formula $RR^1NR^2$ wherein R, $R^1$ and $R^2$ are independently selected from hydrogen, alkyl, hydroxyalkyl, and combinations thereof;

U. Any one of the embodiments A through T wherein the breaker package comprises triethylamine or triethanolamine;

V. Any one of the embodiments A through U wherein the treatment fluid comprises a stabilizer;

W. Any one of the embodiments A through V wherein the treatment fluid comprises sodium thiosulfate;

X. Any one of the embodiments B, C, D, E and F through W (as related to embodiments B, C, D or E) wherein the treatment comprises fracturing a formation penetrated by the well;

Y. Any one of the embodiments A through X wherein the treatment fluid comprises proppant;

Z. Any one of the embodiments B, C, D, E and F through Y (as related to embodiments B, C, D or E) wherein the breaker package is added to the treatment fluid before or during the introduction into the well;

AA. Any one of the embodiments B, C, D, E and F through Y (as related to embodiments B, C, D or E) wherein the breaker package is injected into a formation penetrated by the well in a separate fluid stage to mix with the treatment fluid in the formation;

BB. Any one of the embodiments B, C, D, E and F through AA (as related to embodiments B, C, D or E) wherein the polymer is broken in less than 4 hours, less than 2.5 hours, less than 2 hours, or in a window from about 5 minutes up to less than about 150 minutes or less than about 60 minutes, following the contact;

CC. Any one of the embodiments B, C, D, E and F through BB (as related to embodiments B, C, D or E) comprising fracturing a subterranean formation penetrated by the well, contacting the formation with the treatment fluid and breaking the treatment fluid in the formation;

DD. A well treatment method comprising introducing an aqueous treatment fluid comprising a viscosifying polymer into the well, contacting the fluid with a breaker package comprising an organic peroxide, an activator and a delay agent, wherein the peroxide comprises peroxyester and the break delay agent comprises triethylamine or triethanolamine, wherein the soluble amine compound has the formula $R^3R^4N((CR^5R^6)_2—NR^7)_n—R^8$ wherein n is from 2 to 8 and wherein $R^3$, $R^4$, $R^5$, $R^6$, $R^7$ and $R^8$ are independently selected from hydrogen, alkyl, hydroxyalkyl, and combinations thereof, wherein a weight ratio of the soluble amine to organic peroxide is from about 1:1 to about 20:1, and breaking the treatment fluid;

EE. Embodiment DD wherein the peroxide comprises peroxyester and the functional break delay agent comprises triethylamine, triethanolamine or a mixture thereof, and FF. Either one of the embodiments DD or EE comprising fracturing a subterranean formation penetrated by the well, contacting the formation with the treatment fluid and breaking the treatment fluid in the formation.

Embodiments relate to compositions and methods used in treating a subterranean formation. In particular, the invention relates to the viscosity reduction of polymer gels after use in a structure such as a well, formation penetrated by the well, or the like, in hydraulic fracturing, sand control, workover operations, and the like. In particular, embodiments provide means to reduce the viscosity, for example, by reducing the molecular weight of the polymer, whether or not the polymer is crosslinked. In embodiments of the treatment fluid, certain break activators, break delay agents, or mixtures of activators with delay agents, can substantially alter the effect of organic peroxide breakers, allowing the breaker package to enhance, moderate, or inhibit the rate of reducing the viscosity by the peroxide, or increase the rate of reducing the viscosity. In addition to embodiments increasing the rate of viscosity reduction, certain embodiments of the activators can reduce the amount of organic peroxide needed. For example, an activator used in a breaker package together with certain organic peroxides used can effectively reduce the required concentration of the peroxide by a factor of about 50 relative to organic peroxide breaker concentrations reported in the art.

In one embodiment, the use of a general class of organic peroxides can reduce the molecular weight of polymer gels, such as polysaccharides and water-soluble synthetic polymers, thus reducing the viscosity. In an embodiment, classes of organic peroxides can include diacyl peroxides, dialkyl peroxides, diperoxyketals, hydroperoxides, ketone peroxides, peroxydicarbonates, peroxyesters, and the like. In another embodiment, the classes of organic peroxides do not include ketone peroxides such as pentanedione peroxide, i.e. the classes of organic peroxides can include diacyl peroxides, dialkyl peroxides, diperoxyketals, hydroperoxides, peroxydicarbonates, peroxyesters, combinations thereof and the like.

In one embodiment, the organic peroxide comprises peroxyester. In an embodiment, the peroxyester can be selected from the group consisting of t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids, OO-t-alkyl O-alkyl diesters of monoperoxycarbonic acids, and combinations thereof and the like. In an embodiment, the peroxide comprises a t-alkyl ester of a peroxycarboxylic acid, such as t-butyl peroxybenzoate or the like.

Particularly useful peroxides in various embodiments include, but are not limited to, t-butyl peroxybenzoate, a peroxyester marketed under the commercial designation LUPEROX P; cumene hydroperoxide, a hydroperoxide sold under the commercial designation LUPEROX CU90; di(t-butyl) peroxide, a dialkylperoxide available under the commercial designation LUPEROX DI; and the like.

The peroxide can be used at any concentration effective to break the fluid viscosity of the treatment fluid in the desired time frame, depending on the break conditions, such as, for example, temperature, pressure, pH, the presence or absence or concentration of other breaker package components such as activator, delay agent, stabilizer, etc., which may exist downhole in an embodiment. If insufficient peroxide is used, the fluid viscosity break may take longer than desired or may not occur at all; if excessive peroxide is used the break may occur too early, or the cost of the treatment job may become excessive. In an embodiment, the peroxide can be used at within a range from any lower limit of about 1, 5, 10, 25, 35, 40, 50, 100 or 150 ppm, up to any upper limit of about 10,000, 5000, 3000, 2500, 2000, 1500, 1200, 1000, 750, 500, 300, 250, or 200 ppm, by weight of the aqueous phase. Especially in an embodiment where the peroxide is used with an activator as described herein, the peroxide content can be one of the lower ranges, such as, for example, from about 1 to about 1500 ppm, from about 5 to about 1200 ppm, from about 10 to about 1000 ppm, from about 25 to about 500 ppm, or the like. In one embodiment, the amount of peroxide used in or with the treatment fluid is less than 1500, 1200, 1000 or 500 ppm.

In embodiments, the organic peroxide can be employed in any active physical form that is commercially available, such as, for example, neat as a liquid or solid, or in an aqueous or organic solution, dispersion, emulsion, invert emulsion, or slurried as a pure solid or mixed with or supported on an inert or soluble carrier, encapsulated, coated or the like, including combinations of the foregoing. The physical form of the peroxide in embodiments can affect the activity and or storage stability of the peroxide, e.g., hydrophobically coated particles can delay breaking whereas very small particle size distributions of the peroxide or depositing the peroxide on particles such as alumina, magnesia, titania, carbon black, polymer, or the like, can accelerate breaking and can also facilitate storage and transport stability prior to use. In one embodiment, the peroxide is supported on finely divided silica or calcium carbonate, such as, for example, t-butyl peroxybenzoate supported on calcium carbonate at 50 weight percent active peroxide available under the trade designation LUPEROX PXL. In embodiments, the peroxide can be supplied separately or pre-blended, mixed or compounded with other additives such as the activator, delay agent or the like.

In one embodiment, the use of an activator can enhance the break activity of the peroxide. Examples of activators are ethyleneamines, cobalt (II), copper chelates, e.g., copper ethylenediamine tetraacetic acid (EDTA), organic acids, e.g., para-toluenesulfonic acid, N-alkyl and N,N-dialkyl anilines, e.g. N-methyl aniline, N,N-dimethyl aniline, combinations thereof and the like.

In one embodiment, the activator comprises an ethyleneamine, such as, for example, a polyamine according to the chemical formula $R^3R^4N((CR^5R^6)_2-NR^7)_n-R^8$ wherein $R^3$, $R^4$, $R^5$, $R^6$, $R^7$ and $R^8$ are independently selected from hydrogen, alkyl, substituted alkyl, and combinations thereof and the like. In one embodiment, the substituted alkyl is substituted with one or more hydrophilic functional groups for improved water solubility, such as, for example, carboxylic acids; carboxy salts; carboxy esters, amides and imides; hydroxy; alkoxide; phenoxide; thiolate; thioether; xanthate; cyanide; nitrile; amino and mixtures thereof. In one embodiment, the hydrophilic functional groups, where present, are substituted on an alkyl group in one or more of the $R^3$, $R^4$, $R^7$ or $R^8$ alkyls. In one embodiment $R^3$, $R^4$, $R^5$, $R^6$, $R^7$ and $R^8$ are independently selected from hydrogen, alkyl, hydroxyalkyl, carboxyalkyl, amidoalkyl, imidoalkyl, alkoxyalkyl, phenoxyalkyl, thioalkyl, xanthoalkyl, cyanoalkyl, nitriloalkyl, aminoalkyl, combinations thereof, and the like. In one embodiment, the ethyleneamine is water soluble. In an embodiment, the ethyleneamine has up to 50, 40, 30, 24, 18, 12, 10, 8 or 6 carbon atoms. In an embodiment, each of $R^3$, $R^4$, $R^5$, $R^6$, $R^7$ and $R^8$ is hydrogen, alkyl, or hydroxyalkyl having from 1 to 12, 10, 8, 6, 5, 4, 3, or 2 carbon atoms. In an embodiment, n is from 2 or 3 up to about 8, 7, 6 or 5.

In an embodiment, the activator is an ethyleneamine of the general formula $H_2N((CH_2)_2-NH)_n-H$, with n ranging from 2 to about 12, 2 to 8, 3 to 8, 2 to 5, 3 to 5, or the like. In an embodiment, the activator is selected from triethylenetetramine, tetraethylenepentamine, pentaethylenehexamine, combinations thereof and the like.

The activator, in an embodiment, can be used at a concentration effective to reduce the concentration of the peroxide needed to break the fluid viscosity. In one embodiment, the activator or mixture of activators is used at a concentration up to 2 percent by weight of the peroxide. In another embodiment, the activator is used at a concentration greater than 2 or greater than about 5 percent, by weight of the peroxide. In one embodiment, the activator is used at a weight ratio of activator:peroxide in a range from any lower limit of at least about 1:20, 1:10, 1:5, 1:1 or 5:1, up to any higher upper limit of 1000:1, 100:1, 50:1 or 20:1. For example, in embodiments, the activator:peroxide weight ratio can be from 1:20 to 100:1, 1:1 to 20:1, or the like.

In an embodiment, the peroxide is used with a delay agent to delay the onset of fluid viscosity breaking. In an embodiment, the delay agent is controllable so that a proportion of the delay agent can be used to adjust the break time to a desired window. In contrast, a stabilizer as used herein refers to a compound that quenches the peroxide reactions above a threshold concentration. In an embodiment, the delay agent comprises an amine compound of the formula $RR^1NR^2$ wherein R, $R^1$ and $R^2$ are independently selected from hydrogen, alkyl, substituted alkyl, and combinations thereof and the like. In one embodiment, the substituted alkyl is substituted with one or more hydrophilic functional groups for improved water solubility, such as, for example, carboxylic acids; carboxy salts; carboxy esters, amides and imides; hydroxy; alkoxide; phenoxide; thiolate; thioether; xanthate; cyanide; nitrile; amino and mixtures thereof. In one embodiment R, $R^1$ and $R^2$ are independently selected from hydrogen, alkyl, hydroxyalkyl, carboxyalkyl, amidoalkyl, imidoalkyl, alkoxyalkyl, phenoxyalkyl, thioalkyl, xanthoalkyl, cyanoalkyl, nitriloalkyl, aminoalkyl, combinations thereof, and the like. In one embodiment, the delay agent is water soluble. In an embodiment, the delay agent has up to 50, 40, 30, 24, 18, 12, 10, 8 or 6 carbon atoms. In an embodiment, each of R, $R^1$ and $R^2$ is hydrogen, alkyl, or hydroxyalkyl having from 1 to 30, 24, 18, 12, 10, 8, 6, 5, 4, 3, or 2 carbon atoms. In an embodiment, n is from 2 or 3 up to about 8, 7, 6 or 5. In an embodiment, each of R, $R^1$ and $R^2$ is ethyl or hydroxyethyl. In one embodiment, the delay agent comprises triethylamine, triethanolamine or a mixture thereof The delay agent, in an embodiment, can be used at a concentration effective to delay the onset of the peroxide breaking of the fluid viscosity. In one embodiment, the delay agent or mixture of delay agents is used at a weight ratio of delay agent:peroxide in a range from any lower limit of at least about 1:20, 1:10, 1:5, 1:1 or 5:1, up to any higher upper limit of 1000:1, 100:1, 50:1 or 20:1. For example, in embodiments, the delay agent:peroxide weight ratio can be from 1:20 to 100:1, 1:1 to 20:1, or the like.

Suitable stabilizers for the peroxide breakers in an embodiment can include organic compounds capable of trapping or stabilizing free radicals, e.g. antioxidants. In an embodiment, stabilizers can also or alternatively include compounds that can decompose peroxides, e.g. into alcohols, through a non-radical path. Natural antioxidants such as uric acid, ascorbic acid, tocopherol, and hydroxylamine, are suitable as stabilizers in an embodiment. Other embodiments of stabilizers include: sulfur containing compounds such as sodium dithionite, sodium thiosulfate, cysteine, glutathione and sulphur-containing alkylated phenols such as IRGANOX 1520 and IRGANOX 1726; hydroquinone and its derivatives such as quinone, methylquinone, methylhydroquinone, and t-butyl hydroquinone; phenolic stabilizers such as 2,4-dimethyl-6-t-butylphenol, 2,6-di-t-butylphenol, 2,4 dimethyl-6-t butylphenol, 2,6-di-t-butyl-4-methylphenol; aromatic amine hydrogen donors such as phenothiazine, N,N'-diphenyl-p-phenylenediamine available under the trade designation NONFLEX H from Seiko Chemical, octylated diphenylamine available under the trade designation NONFLEX OD-3 from Seiko chemical, 4,4'-bis($\alpha,\alpha'$[dimethylbenzyl] diphenylamine), [4,4'-dicumyl-diphenylamine commercially available under the trade designation NONFLEX DCD from Seiko chemical; hindered amine compounds considered as radical scavengers such as compounds with the HP-136 lactone chemistry (benzofuranone derivative) and hydroxylamine FS042 from Ciba Specialty Chemicals; alkylated bisphenols, especially under oxygen deficient condition such as those found downhole; organophosphorous compounds such as phosphites or phosphonites that can be oxidized to phosphates, such as the IRGAFOS® stabilizers available from Ciba Specialty Chemicals, for example, tris(nonylphenol) phosphite (IRGAFOS TNPP) or tris(2,4-di-t-butylphenol) phosphite (IRGAFOS 168); thiother compounds that can be oxidized to sulfoxides and sulfones; and the like. Further, the stabilizers can be used in mixtures of two or more stabilizers.

The stabilizer, in an embodiment, can be used at a concentration effective to stabilize or quench the peroxide radicals and prevent premature degradation of the peroxide or other breaker package compounds. In one embodiment, the stabilizer or mixture of stabilizers is used at a weight ratio of stabilizer:peroxide in a range from any lower limit of at least about 1:20, 1:10, 1:5, 1:1 or 5:1, up to any higher upper limit of 1000:1, 100:1, 50:1 or 20:1. For example, in embodiments, the stabilizer:peroxide weight ratio can be from 1:20 to 100:1, 1:1 to 20:1, or the like.

Fluids useful in embodiments may include a viscosifier that may be a polymer that is either crosslinked or linear, or any combination thereof. Many polymers are commonly used to thicken or otherwise modify the rheology of treatment fluids such as gravel packing and fracturing fluids. Polymers include natural polymers, derivatives of natural polymers, synthetic polymers, biopolymers, and the like, or any mixtures thereof. An embodiment uses any viscosifying polymer used in treating subterranean to form gels. Some non-limiting examples of suitable polymers include: polysaccharides, such as, for example, guar gums, high-molecular weight polysaccharides composed of mannose and galactose sugars, including guar derivatives such as hydroxypropyl guar (HPG), carboxymethyl guar (CMG), carboxymethylhydroxypropyl guar (CMHPG), cationic guar (for example, quaternary ammonium derivative such as guar hydroxytrimonium chloride), and other polysaccharides such as xanthan, diutan, and scleroglucan; cellulose derivatives such as hydroxyethyl cellulose (HEC), hydroxypropyl cellulose (HPC), carboxymethylhydroxyethyl cellulose (CMHEC), and the like; synthetic polymers such as, but not limited to, acrylic and methacrylic acid, ester and amide polymers and copolymers, polyalkylene oxides such as polymers and copolymers of ethylene glycol, propylene glycol or oxide, and the like. The polymers may be water soluble. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in US 2004209780.

As used herein, when a polymer is referred to as comprising a monomer or comonomer, the monomer is present in the polymer in the polymerized form of the monomer or in the derivative form of the monomer. However, for ease of reference the phrase comprising the (respective) monomer or the like may be used as shorthand. Also herein, the terms linear and non-crosslinked are used interchangeably in reference to polymers to indicate that there are no chemical interconnections between the polymer chains, even though the polymer may have pendant groups or short chain branching from the backbone.

In some cases, the polymer or polymers are formed of a linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Some examples of such hydroxyalkyl guars include hydroxyethyl guar (HE guar), hydroxypropyl guar (HP guar), and hydroxybutyl guar (HB guar), and mixed $C_2$-$C_4$, $C_2$/$C_3$, $C_3$/$C_4$, or $C_2$/$C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{24}$-alkyl-substituted hydroxyalkyl galactomannans, e.g., wherein the amount of alkyl substituent groups is preferably about 2 percent by weight or less by weight of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting are illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans in one embodiment comprise a polymannose backbone attached to galactose branches that are present at an average ratio of from 1:1 to 1:5 galactose branches:mannose residues. Preferred galactomannans comprise a 1→4-linked β-D-mannopyranose backbone that is 1→6-linked to a-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to tara gum (e.g., from Cesalpinia spinosa seeds) and guar gum (e.g., from Cyamopsis tetragonoloba seeds). In addition, although embodiments of the present invention may be described or exemplified with reference to guar, such as by reference to hydroxy-$C_1$-$C_4$-alkyl guars, such descriptions apply equally to other galactomannans, as well.

When incorporated in the well treatment or other fluid, the polymers may be present at any suitable concentration. In various embodiments hereof, the polymer can be present in an amount of from about 0.01 g/L of fluid (0.1 lb/1000 gal of fluid (ppt)) to less than about 7.2 g/L (60 ppt), or from about 0.018 to about 4.8 g/L (about 1.5 to about 40 ppt), from about 0.018 to about 4.2 g/L (about 1.5 to about 35 ppt), or from 0.018 to about 3 g/L (1.5 to about 25 ppt), or even from about 0.24 to about 1.2 g/L (about 2 to about 10 ppt). In other embodiments, the polymer is present in the treatment fluid at a rate within a range of from any lower limit selected from 0.0001, 0.001, 0.01, 0.025, 0.05, 0.1, or 0.2 percent by weight of the liquid phase, up to any higher upper limit selected from 1.0, 0.5, 0.4, 0.25, 0.2, 0.15 or 0.1 percent by weight of the liquid phase.

In one embodiment, the polymer comprises a heteropolysaccharide. While any suitable heteropolysaccharide may be used, microbial polysaccharides commonly known as sphingans are particularly useful. Sphingans generally are acidic capsular heteropolysaccharides secreted by Sphingomonas bacteria as described by Pollock, T. J., Sphingan Group of Exopolysaccharides (EPS), in Biopolymers, Vol. 5, E. J. Vandamme, S. DeBaets, and A. Steinbüchel, Editors. 2002, Wiley-VCH Verlag GmbH, p. 239-258. In some embodiments of the invention, the heteropolysaccharide is a sphingan or a derivatized sphingan having a tetrasaccharide repeating unit in the polymer backbone as represented by the chemical formula:

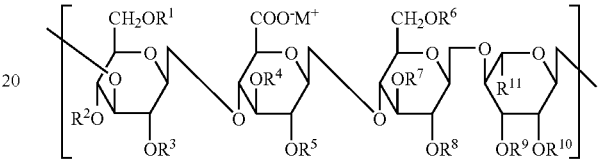

or represented by the alternative formula scheme:

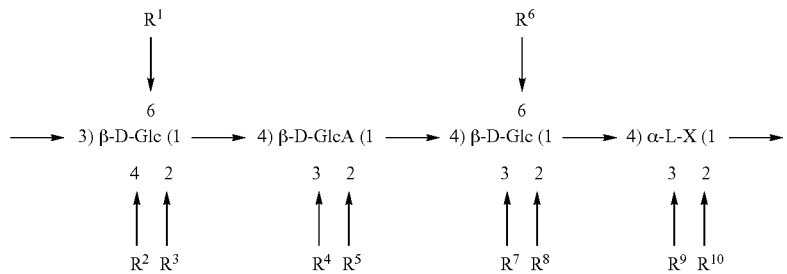

wherein at least three different saccharides are present in the repeating unit, such saccharides including D-glucose (D-Glc), D-glucuronic acid (D-GlcA), and either L-rhamnose (X=Rha; $R^{11}$=$CH_3$) or L-mannose (X=Man; $R^{11}$=$CH_2OH$); the weight average molecular weight (Mw) for the heteropolysaccharide is from about $10^5$ to about $10^7$; $M^+$ is any ionic species effective to associate via electrostatic interactions with the carboxylic group present in the D-glucuronic acid unit, wherein $M^+$ includes, for example, but not necessarily limited to: $H^-$, $Na^+$, $K^+$, $NH_4^+$, ½ $Ca^+$ and ½ $Mg^{+2}$; substituents for the number 2 positions of all saccharide units ($R^3$, $R^5$, $R^8$, and $R^{10}$), substituents for the number 3 positions of the position number 4-linked saccharide units ($R^4$, $R^7$, and $R^9$), substituent for the number 4 position of the position 3-linked glucose unit ($R^2$), and substituents for the number 6 positions of the D-glucose units ($R^1$ and $R^6$) may be by non-limiting example a hydrogen (—H), methyl (—$CH_3$), acetyl (—$COCH_3$), glyceryl (—$COCH_2(OH)CH_2OH$) or a saccharide group containing one to three saccharide units, wherein the saccharide units present in the saccharide side-group include, but are not limited to: D-glucose, D-glucuronic acid, D-galacturonic acid, L-rhamnose, L-mannose, D-mannose, 2,3:5,6-gi-O-isopropylidene-D-mannofuranose, 2,3-O-isopropylidene-D-ribono-1,4-lactone, 3,4-O-isopropylidene-D-mannitol, D-arabinose, L-arabinose, D-erythrose, L-erythrose, D-fucose, L-fucose, lactulose, D-lyxose, maltulose, L-mannitol, D-mannono-1,4-lactone, L-mannono-1,4-lactone, methyl-α-D-fucopyranoside, D-ribonic acid, D-ribono-1,4-lactone, L-ribose, D-sorbose, D-tagatose, D-talitol, D-talose, L-xylose, and the like, and any derivatives. In addition, the substituents $R^1$ thru $R^{11}$ above may differ from repeating unit to repeating unit within the heteropolysaccharide's backbone chemical structure. For example, $R^1$ could be hydrogen (—H) in one repeating unit and an acetyl group (—COCH$_3$) in the following repeating unit.

Suitable sphingans or derivatized sphingans include, but are not necessarily limited to, the following heteropolysaccharides and derivatives thereof: gellan gum as described in Kuo, M. S., A. J. Mort, and A. Dell, Identification and location of L-glycerate, an unusual acyl substituent in gellan gum, Carbohydrate Research, 1986, 156: p. 173-187, wherein $R^1$, $R^2$, $R^3$, $R^4$, $R^5$, $R^6$, $R^7$, $R^8$, $R^9$, and $R^{10}$ are hydrogen (—H) groups, and $R^{11}$ is a methyl (—CH$_3$) group (or X=Rha); welan gum as described by Stankowski, J. D. and S. G. Zeller, Location of the O-acetyl group in welan by the reductive-cleavage method, Carbohydrate Research, 1992, 224: p. 337-341, wherein $R^1$, $R^2$, $R^3$, $R^4$, $R^5$, $R^6$, $R^8$, $R^9$, and $R^{10}$ are hydrogen (—H) groups $R^{22}$ is a methyl (—CH$_3$) group (or X=Rha), and $R^7$ is an α-L-rhamnose or α-L-mannose group (α-L-Rha (1→, or α-L-Man (1→); diutan gum as described by Chowdhury, T. A., et al., Structural studies of an extracellular polysaccharide, S-657, elaborated by Xanthomonas ATCC 53159, Carbohydrate Research, 1987, 164: p. 117-122, wherein $R^1$, $R^2$, $R^3$, $R^4$, $R^5$, $R^6$, $R^8$, $R^9$, and $R^{10}$ are hydrogen (—H) groups, $R^{11}$ is a methyl (—CH$_3$) group (or X=Rha), and $R^7$ is two α-L-rhamnose groups linked at the 1,4 ring positions (α-L-Rha (1→4) α-L-Rha (1→); heteropolysaccharide S-8, also known as S-657/ps8, available from CP Kelco of 123 North Wacker Dr, Suite 2000 Chicago, Ill. 60606 USA, as described in WO 2007/053612, which is hereby incorporated herein by reference; rhamsan gum as described by Jansson, P. E., et al., Structural studies of a polysaccharide (S-194) elaborated by Alcaligenes ATCC 31961, Carbohydrate Research, 1986, 156: p. 157-163, wherein $R^2$, $R^3$, $R^4$, $R^5$, $R^6$, $R^7$, $R^8$, $R^9$, and $R^{10}$ are hydrogen (—H) groups, $R^{11}$ is a methyl (—CH$_3$) group (or X=Rha), and $R^1$ is two β-D-glucose groups linked at the 1,6 ring positions (β-D-Glc (1→6) β-D-Glc (1→);

heteropolysaccharide S-88 as described by Jannson, P. E., N. S. Kumar, and B. Lindberg, Structural studies of a polysaccharide (S-88) elaborated by Pseudomonas ATCC 31554, Carbohydrate Research, 1986, 156: p. 165-172, wherein $R^1$, $R^2$, $R^3$, $R^4$, $R^5$, $R^6$, $R^8$, $R^9$, and $R^{10}$ are hydrogen (—H) groups, $R^{11}$ is a methyl (—CH$_3$) group (X=Rha) or methylol (—CH$_2$OH) group (X=Man), and $R^7$ is an α-L-rhamnose group (α-L-Rha (1→); heteropolysaccharide S-198 as described by Chowdhury, T. A., B. Lindberg, and U. Lindquist, Structural studies of an extracellular polysaccharide (S-198) elaborated by Alcaligenes ATCC 31853, Carbohydrate Research, 1987, 161: p. 127-132, wherein $R^1$, $R^3$, $R^4$, $R^5$, $R^6$, $R^7$, $R^8$, $R^9$, and $R^{10}$ are hydrogen (—H) groups, $R^{11}$ is a methyl (—CH$_3$) group (X=Rha) or methylol (—CH$_2$OH) group (X=Man), and $R^2$ is an α-L-rhamnose group (α-L-Rha (1→); and, heteropolysaccharide NW11 as described in Pollock, T. J., Sphingan Group of Exopolysaccharides (EPS), in Biopolymers, Vol. 5, E. J. Vandamme, S. DeBaets, and A. Steinbüchel, Editors, 2002, Wiley-VCH Verlag GmbH, p. 239-258, wherein $R^1$, $R^2$, $R^3$, $R^4$, $R^5$, $R^6$, $R^7$, $R^8$, $R^9$, and $R^{10}$ are hydrogen (—H) groups, and $R^{11}$ is a methylol (—CH$_2$OH) group (X=Man).

In one embodiment, the heteropolysaccharide used in fluids of the invention is a diutan gum having a tetrasaccharide repeating unit in the polymer backbone as represented by the chemical formula:

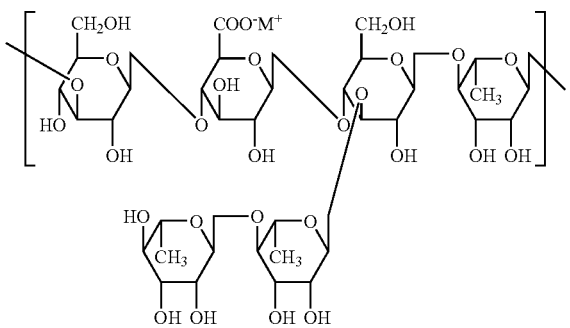

or represented by the alternative formula scheme:

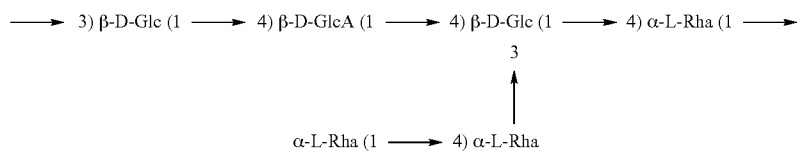

wherein $M^+$ is any ionic species effective to associate via electrostatic interactions with the carboxylic group, wherein $M^+$ includes, for example, but not necessarily limited to, $H^+$, $Na^+$, $K^+$, $NH_4^1$, ½ $Ca^{+2}$ and 2 $Mg^{+2}$; and the weight average molecular weight (Mw) for the diutan gum is from about $10^5$ to about $10^7$. Diutan heteropolysaccharides are available, for example, from CP Kelco of 123 North Wacker Dr, Suite 2000 Chicago, Ill. 60606 USA, and may also be used in either crosslinked form, or without crosslinker. Diutan is generally composed of carbohydrate, about 12% protein and about 7% (calculated as O-acetyl) acyl groups, where the carbohydrate portion containing about 19% glucuronic acid, and the neutral sugars rhamnose and glucose are present in the approximate ratio of 2:1. Details of preparing diutan are given in U.S. Pat. No. 5,175,278 (Peik et al.), hereby incorporated by reference. O-acetyl groups may also be present on the number 2 position and the 2,6-positions of the 3-linked D-Glucose unit as described in Diltz, S. and S. G. Zeller, Location of O-acetyl groups in S-657 using the reductive-cleavage method. Carbohydrate Research, 2001. 331: p. 265-270.

Heteropolysaccharides are incorporated into the fluid embodiments of the invention in amounts ranging from about 0.01% to about 1.0 % by weight of total weight of liquid phase, and preferably from about 0.10 % to about 0.40 % by weight of total weight of liquid phase.

While linear or non-crosslinked polymer systems can be used in an embodiment, they generally require higher polymer levels for the same Theological modification. In some embodiments, the fluids used may further include a crosslinker. Adding crosslinkers to the fluid may further augment the viscosity of the fluid. Crosslinking consists of the attachment of two polymeric chains through the chemical association of such chains to a common element or chemical group. Suitable crosslinkers may comprise a chemical compound containing a polyvalent ion such as, but not necessarily limited to, boron or a metal such as chromium, iron, aluminum, titanium, antimony and zirconium, or mixtures of polyvalent ions. Suitable boron crosslinked polymers systems include by non-limiting example, guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines), and carboxylates such as acetates and oxalates; and with crosslink delay agents such as sorbitol, aldehydes, and sodium gluconate.

In an embodiment, the activator for the peroxide breaker and/or the delay agent to control breaker onset can also function as the pH control agent, especially where the concentration of the amine needed for effective pH control is similar to the concentration of the amine activators or delay agents for the peroxides herein. In another embodiment, the pH control agent is free of amines that can adversely influence the peroxide breaker system.

Suitable zirconium crosslinked polymer systems include by non-limiting example, those crosslinked by zirconium complexes such as lactates (for example sodium zirconium lactate), triethanolamines, 2,2'-iminodiethanol, amino acids, and with mixtures of these ligands, including when adjusted with bicarbonate. Suitable titanates include by non-limiting example, lactates and triethanolamines, and mixtures, for example delayed with hydroxyacetic acid.

In some aspects, the invention uses treatment fluid comprising a brine carrier having a density of at least 1.02 kg/L (8.5 ppg (8.5 pounds per gallon)), but may be as low as 1 kg/L (8.3 ppg). As used herein, a heavy brine, sometimes also called a high density brine or high brine, is an aqueous inorganic salt solution having a specific gravity of greater than about 1.02 kg/L (8.5 lb/gal (ppg)), 1.08 kg/L (9 ppg) or 1.14 kg/L (9.5 ppg), especially above 1.2, 1.32, 1.44 or 1.5 kg/L (10, 11, 12 or 12.5 ppg), or up to 1.8 kg/L (15 ppg). Available water, other than brine, may also be used in some embodiments as the carrier for the treatment fluid.

When used, the brine is water comprising an inorganic salt or organic salt. Embodiments of inorganic monovalent salts include alkali metal halides, more preferably sodium, potassium or cesium bromide. Embodiments of inorganic divalent salts include calcium halides, for example, calcium chloride or calcium bromide. Zinc halides, especially zinc bromide, may also be used. Inorganic salt can be added to the carrier fluid in any hydration state (i.e. anhydrous, monohydrated, dihydrated, etc.). The carrier brine phase may also comprise an organic salt, in embodiments sodium or potassium formate, acetate or the like, which may be added to the treatment fluid up to a concentration at which phase separation might occur, approximately 1.14 kg/L (9.5 ppg). In an embodiment, mixture of organic and inorganic salts can achieve a density higher than about 1.2 kg/L (10 ppg).

The salt in one embodiment is compatible with the drilling fluid that was used to drill the wellbore, e.g. the salt in the treatment fluid used as a prepad or preflush, or in a completion/clean up fluid, can be the same as the salt used in the drilling fluid. In embodiments where hydroxyethylaminocarboxylic acids are used for wellbore clean up, for example, the treatment brine for delivering the diamine ether can consist essentially of monovalent salts, avoiding divalent salts might form chelates or other complexes and thus make less of the hydroxyethylaminocarboxylic acid available for clean up. In an embodiment, where a zwitterionic surfactant is employed, the electrolyte should also be compatible with the brine, for example, a density up to 1.2 kg/L (10 ppg) where the brine phase of other completion or reservoir drilling fluids comprises potassium formate, sodium acetate or the like at up to about 24 wt % (1. 14 kg/L (9.5 ppg)). In an embodiment, the electrolyte in the treatment fluid may be used in an amount of from about 0.01 wt % to about 30.0 wt % of the total liquid phase weight.

Crosslinked gels used according to the invention may in some embodiments, be employed as high density fluids to create hydraulic fractures in formations and to transport proppant into those fractures to hold them open and increase productivity. The gels may also be used to transport gravel to place a gravel pack to prevent the transport of formation sand into the wellbore during production. Additionally, the gels may be used in a dual-purpose 'frac-pack' application where a hydraulic fracture is created and a pack is placed. Such a weighted fluid would be especially desirable in deep and ultra deep wells where surface treating pressures are expected to be high. The hydrostatic pressure generated by the weighted fluid may be able to lower the surface treating pressures. The fact that this fluid is formulated in Ca based brines would make it an inexpensive (and more readily available) alternative to NaBr based fluids currently used in aforementioned applications.

In order to reduce the viscosity of the fluid after the treatment, dissolved, slurried and/or encapsulated breakers, including the peroxide breaker embodiments herein, alone or in combination with another compatible breaker system, may be used with the fluid. The higher densities allowed by $CaCl_2$/$CaBr_2$ brines will likely make these fluids more effective than NaBr based fluids in inhibiting hydrate formation during flowback. The higher densities will also make these fluids more effective for well control. In addition, calcium based brines are known to be more effective for controlling fines migration than sodium based brines. If bridges are formed, the use of a weighted fluid through shunt tubes allows bypassing the bridges and effectively packing the voids.

To form the brine, any suitable weighting salt may be used, such as magnesium chloride, calcium chloride, calcium bromide, zinc halide, sodium carbonate, and sodium bicarbonate salts, and the like. Any mixtures of the inorganic salts may be used as well. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. In some embodiments of the invention, the electrolyte is an organic salt such as tetramethyl ammonium chloride, or inorganic salt such as potassium chloride. The electrolyte may be used in an amount of from about 0.01 wt % to about 25.0 wt % of the total liquid phase weight.

The fluids used in some embodiments of the invention may include an additional electrolyte, which may be an organic acid, organic acid salt, organic salt, or inorganic salt. Mixtures of the above members are specifically contemplated as falling within the scope of the invention. This member will typically be present in a minor amount (e.g. less than about 30% by weight of the liquid phase). The organic acid is typically a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Particularly useful organic acids are formic acid, citric acid, 5-hydroxy-1-napthoic acid, 6-hydroxy-1-napthoic acid, 7-hydroxy-1-napthoic acid, 1-hydroxy-2-naphthoic acid, 3-hydroxy-2-naphthoic acid, 5-hydroxy-2-naphthoic acid, 7-hydroxy-2-napthoic acid, 1, 3-dihydroxy-2-naphthoic acid, and 3,4-dichlorobenzoic acid. The inorganic salts that are particularly suitable include, but are not limited to, water-soluble potassium, sodium, and ammonium salts, such as potassium chloride and ammonium chloride.

Friction reducers may also be incorporated into fluids of the invention. Any friction reducer may be used. In addition, polymers such as polyacrylamide, polyisobutyl methacrylate, polymethyl methacrylate and polyisobutylene as well as water-soluble friction reducers such as guar gum, guar gum derivatives, hydrolyzed polyacrylamide, and polyethylene oxide may be used. Commercial drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" have also been found to be effective. These polymeric species added as friction reducers or viscosity index improvers may also act as fluid loss additives reducing or even eliminating the need for conventional fluid loss additives.

A fiber component may be included in the fluids used in the invention to achieve a variety of properties including improving particle suspension, and particle transport capabilities, and gas phase stability. Fibers used may be hydrophilic or hydrophobic in nature, but hydrophilic fibers are particularly useful. Fibers can be any fibrous material, such as, but not necessarily limited to, natural organic fibers, comminuted plant materials, synthetic polymer fibers (non-limiting examples including polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included at concentrations from about 1 to about 15 grams per liter of the liquid phase of the fluid, more particularly, the concentration of fibers may be from about 2 to about 12 grams per liter of liquid, and more particularly, from about 2 to about 10 grams per liter of liquid.

Embodiments of the invention may use other additives and chemicals that are known to be commonly used in oilfield applications by those skilled in the art. These include, but are not necessarily limited to, materials in addition to those mentioned hereinabove, such as breaker aids, amino acids, oxygen scavengers, alcohols, scale inhibitors, corrosion inhibitors, fluid-loss additives, bactericides, iron control agents, organic solvents, and the like.

A buffering agent may be employed to buffer the fluids according to an embodiment, i.e., moderate amounts of either a strong base or acid may be added without causing any large change in pH value of the fracturing fluid. In various embodiments, the buffering agent is a combination of a weak acid and a salt of the weak acid; an acid salt with a normal salt; or two acid salts. Examples of suitable buffering agents are sodium carbonate-sodium bicarbonate, sodium bicarbonate, or other like agents. By employing a buffering agent instead of merely a hydroxyl ion producing material, a fracturing fluid is provided which is more stable to a wide range of pH values found in local water supplies and to the influence of acidic materials located in formations and the like. In an exemplary embodiment, the pH control agent is varied between about 0.6 percent and about 40 percent by weight of the polysaccharide employed.

Some fluid compositions useful in some embodiments of the invention may also include a gas component, produced from any suitable gas that forms an energized fluid or foam when introduced into an aqueous medium. See, for example, U.S. Pat. No. 3,937,283 (Blauer et al.) incorporated herein by reference. Preferably, the gas component comprises a gas selected from the group consisting of nitrogen, air, argon, carbon dioxide, and any mixtures thereof. In an embodiment, the gas component comprises nitrogen or carbon dioxide, in any quality readily available. The gas component may assist in the treatment operation, as well as the well clean-up process. The fluid in one embodiment may contain from about 10% to about 90% or more volume gas component based upon total fluid volume percent, preferably from about 20% to about 80% volume gas component based upon total fluid volume percent, and more preferably from about 30% to about 70% volume gas component based upon total fluid volume percent.

Embodiments of the invention may also include use of proppant particles that are insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh (approx. 0.84 mm to 0.15 mm) in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and, as an example, may be in the range of from about 0.05 to about 3 kilograms of proppant added per liter of liquid phase. In addition, any of the proppant particles can further be coated with a resin to potentially improve the strength, clustering ability, and flow back properties of the proppant.

Conventional propped hydraulic fracturing and frac-pack techniques, with appropriate adjustments if necessary, as will be apparent to those skilled in the art, are used in some methods of the invention. In an example of a fracture stimulation treatment, the treatment may begin with a conventional pad stage to generate the fracture, followed by a sequence of stages in which a viscous carrier fluid transports proppant into the fracture as the fracture is propagated. Typically, in this sequence of stages the amount of propping agent is increased, normally stepwise. The pad and carrier fluid can be, and usually are, a gelled aqueous fluid. The pad and carrier fluids may contain various additives. Non-limiting examples are fluid loss additives, crosslinking agents, clay control agents, breakers, iron control agents, and the like, provided that the additives do not affect the stability or action of the fluid. In embodiments, the peroxide breaker may be present in each of the pad and proppant stages, or in the prepad or postflush stages. In an embodiment, one or more stages may contain the breaker, which then mixes downhole with one or more other stages without breaker. In addition, the peroxide and activator can be pumped in separate stages to mix downhole.

In an embodiment, the peroxide additive can be used as commercially obtained or diluted or slurried, either at the well site or at a remote location prior to shipment and delivery at the wellsite, for addition to the treatment fluid. The peroxide can be added separately to the treatment fluid in the treatment fluid mixing tanks, or as an additive stream injected into a stream of the treatment fluid just prior to or during injection into the wellbore, during transit in the wellbore, or adjacent entry into a formation, e.g. by supplying the peroxide as a pumpable fluid stream at high pressure via a separate tubing, or the like. The activator, delay agent, stabilizer and other additives can be added with the peroxide breaker or in admixture therewith, in embodiments. In one embodiment, the peroxide and stabilizer are added to the treatment fluid at the injection wellhead, and the activator and delay agent, if used, are added upstream from the injection pump after hydration of the polymer with other additives to the treatment fluid.

The procedural techniques for pumping fluids down a wellbore to treat a subterranean formation are well known. The person that designs such fracturing treatments is the person of ordinary skill to whom this disclosure is directed. That person has available many useful tools to help design and implement treatments, one of which is a computer program commonly referred to as a fracture simulation model (also known as fracture models, fracture simulators, and fracture placement models). One commercial fracture simulation model that is widely used by several service companies is known as FracCADE™. This commercial computer program is a fracture design, prediction, and treatment-monitoring program designed by Schlumberger, Ltd. All of the various fracture simulation models use information available to the treatment designer concerning the formation to be treated and the various treatment fluids (and additives) in the calculations, and the program output is a pumping schedule that is used to pump the fracture stimulation fluids into the wellbore. The text "Reservoir Stimulation," Third Edition, Edited by Michael J. Economides and Kenneth G. Nolte, Published by John Wiley & Sons, (2000), is an excellent reference book for fracturing and other well treatments; it discusses fracture simulation models in Chapter 5 (page 5-28) and the Appendix for Chapter 5 (page A-15)), which are incorporated herein by reference.

EXAMPLES

The following examples are presented to illustrate the preparation and properties of aqueous fluids comprising a viscosifying polymer and a peroxide breaker package, and should not be construed to limit the scope of the invention, unless otherwise expressly indicated in the appended claims. All percentages, concentrations, ratios, parts, etc. are by weight unless otherwise noted or apparent from the context.

Example 1

Activation of a low concentration organic peroxide breaker (42 ppm t-butyl hydroperoxide) with 0.15 volume percent tetraethylenepentamine (TEPA). Polymer-peroxide stock solutions with and without TEPA were analyzed for breaker effectiveness. A 0.96 weight percent solution of carboxymethylhydroxypropyl guar (CMHPG) was prepared and hydrated in a 1-liter WARING blender. Separately, t-butyl hydroperoxide supplied as LUPEROX TBH70X (70% active) was diluted to a 1% solution in deionized water. For the baseline without any TEPA, 200 ml of the CMHPG solution were poured into a 500 ml WARING blender cup, and 1.2 ml of the diluted LUPEROX TBH70X were added with stirring. The solution was then loaded into a GRACE M5500 rheometer, and tested at 80° C. with the cup 1 and bob 5 concentric cylinder geometry. The fluid was observed for breaking, which would be observed as a marked reduction in viscosity, e.g. to under 100 mpa-s. No breaking was observed in 60 minutes, as shown in FIG. 1. Similarly, another 200 ml aliquot of the CMHPG solution was blended with 1.2 ml of the diluted LUPEROX TBH70X, but this time 300 µL of tetraethylenepentamine (TEPA) were also added, and the solution was tested on the rheometer in the same manner. FIG. 1 shows the effect of the amine on promoting the break in about 17 minutes.

Example 2

Figure 2:
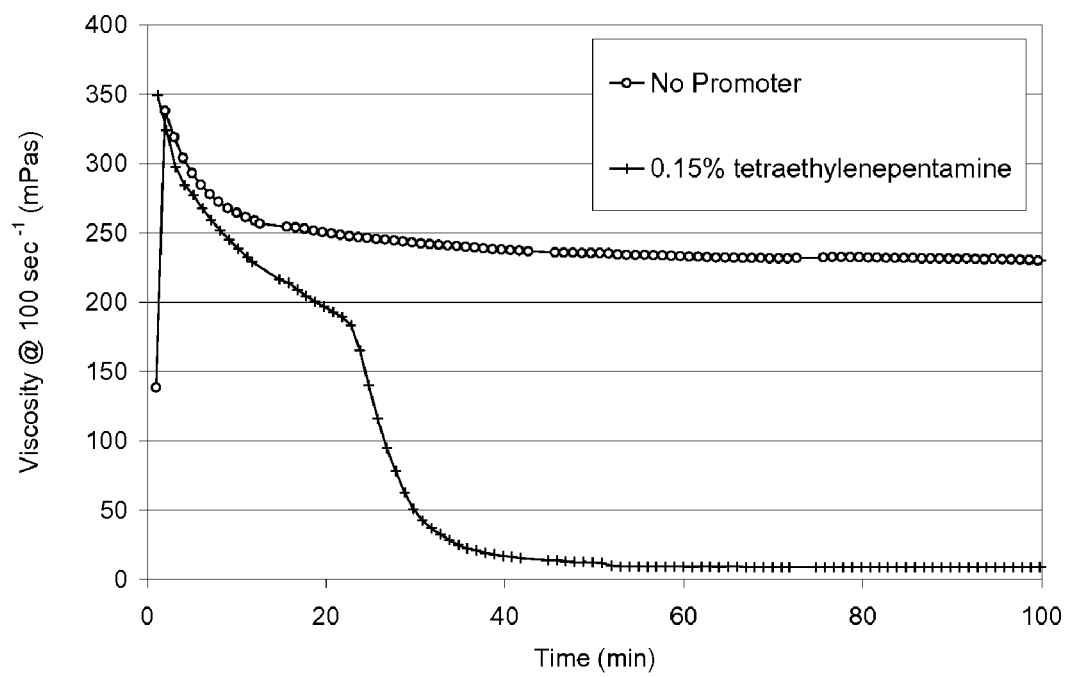
FIG. 2 shows rheometry curves at 80° C. for 0.96 weight percent CMHPG and 150 ppm t-butyl peroxybenzoate with and without 0.15 volume percent TEPA as described in Example 2, and demonstrates that TEPA can activate fluid viscosity breaking of low concentration peroxyesters according to an embodiment of the invention.

Activation of a low concentration peroxyester breaker (150 ppm t-butyl peroxybenzoate) with TEPA. In this example, the organic peroxide, LUPEROX P, supplied by Aldrich, was first dissolved in ESCAID 110 mineral oil supplied by ExxonMobil at a 3% concentration. The same procedure was used as in Example 1, and the results are seen in FIG. 2. Ethylene amines such as TEPA effectively activated low-concentration peroxyesters such as t-butyl peroxybenzoate.

Example 3

Figure 3:
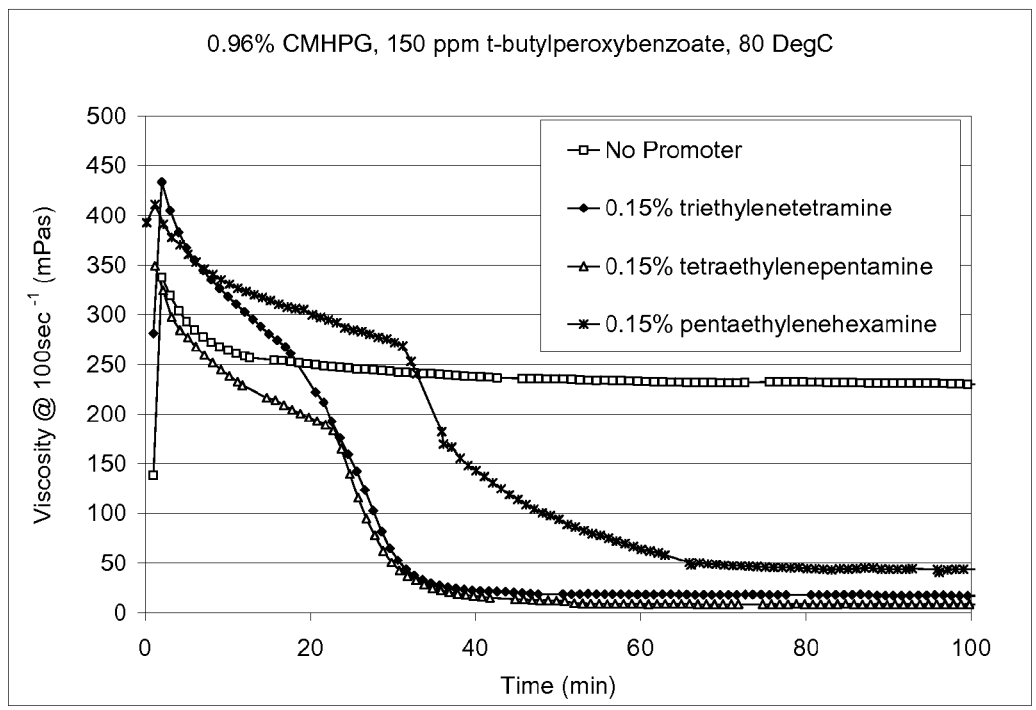
FIG. 3 shows rheometry curves at 80° C. for 0.96 weight percent CMHPG and 150 ppm t-butyl peroxybenzoate with and without 0.15 volume percent triethylenetetramine (TETA), TEPA or pentaethylenehexamine (PEHA) as described in Example 3, and demonstrates that the ethylene amines can activate fluid viscosity breaking of low concentration peroxyesters according to an embodiment of the invention.

Activation of 150 ppm t-butyl peroxybenzoate at 80° C. with 0.15% (vol) of various amine compounds of the general formula $H_2N((CH_2)_2\text{—}NH)_n\text{—}H$ with n ranging from 3 to 5. The procedure of Example 2 was repeated without activator and with 0.15 volume percent of triethylenetetramine (TETA), TEPA and pentaethylenehexamine (PEHA). The rheometry curves in FIG. 3 show that each ethyleneamine was an effective activator of the peroxyester.

Example 4

Figure 4:
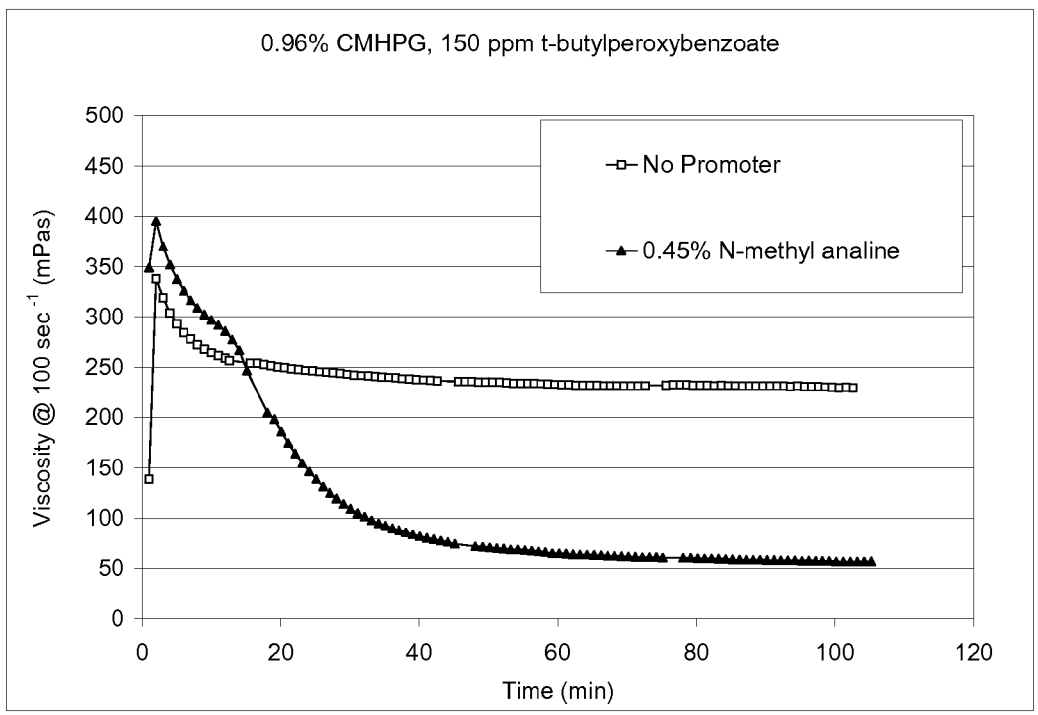
FIG. 4 shows rheometry curves at 80° C. for 0.96 weight percent CMHPG and 150 ppm t-butyl peroxybenzoate with and without 0.45 volume percent N-methyl aniline as described in Example 4, and demonstrates that the N-alkyl anilines can activate fluid viscosity breaking of low concentration peroxyesters according to an embodiment of the invention.

Activation of 150 ppm t-butyl peroxybenzoate at 80° C. with 0.45% (vol) of N-methyl aniline. The procedure of Example 2 was used except that the activator was 0.45 volume percent N-methyl aniline. The rheometry curves in FIG. 4 show that N-methyl aniline was an effective activator of the peroxyester.

Example 5

Figure 5:
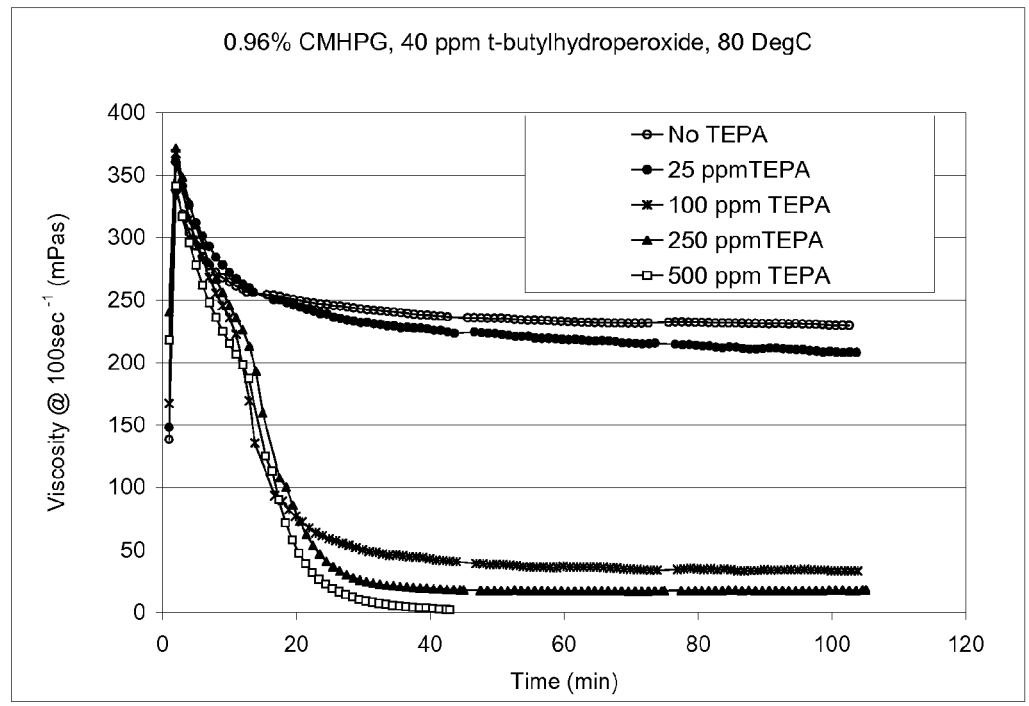
FIG. 5 shows rheometry curves at 80° C. for 0.96 weight percent CMHPG and 40 ppm t-butyl hydroperoxide with 0, 25, 100, 250 and 500 ppm TEPA as described in Example 2, and demonstrates that a proportion of more than 25 ppm TEPA can activate fluid viscosity breaking of low concentration peroxide according to an embodiment of the invention.

Concentration effectiveness of 25-500 ppm TEPA for breaking 0.96% CMHPG at 80° C. with 40 ppm of t-butyl hydroperoxide. Using the same procedure of Example 1 with various amounts of TEPA, it was found that break activation was quite effective at 100 ppm TEPA or more, while 25 ppm had limited effect. Above this threshold in the ranges tested, the addition of more TEPA did not significantly alter the break time. The results are shown in FIG. 5.

Example 6

Figure 6:
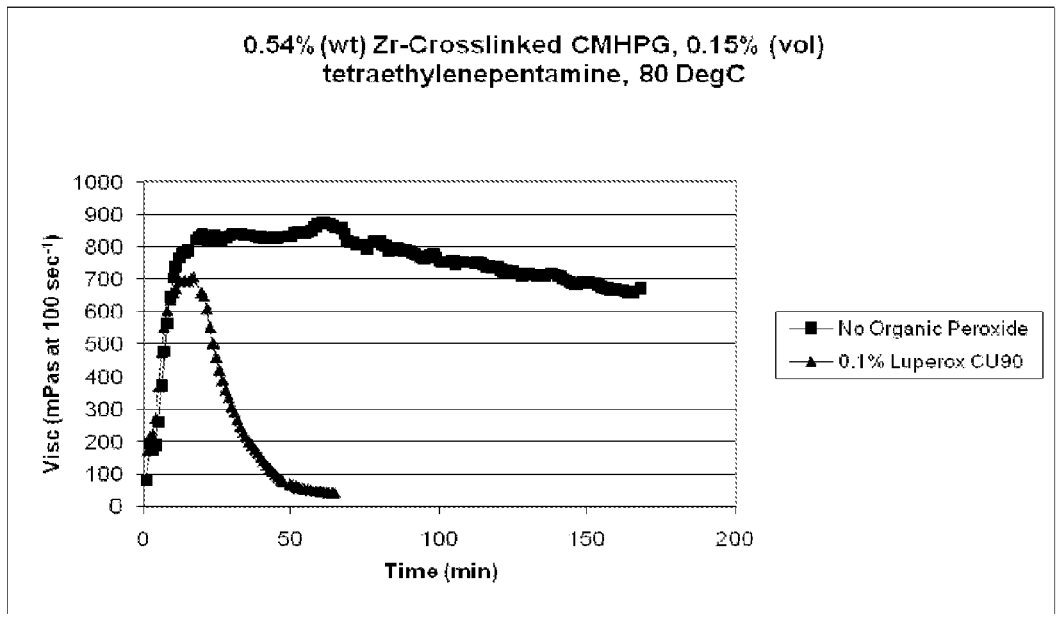
FIG. 6 shows rheometry curves at 80° C. for 0.54 weight percent zirconium crosslinked CMHPG and 0.15 volume percent TEPA with and without 0.1 volume percent cumyl peroxide as described in Example 6, and demonstrates that the low concentration organic peroxide is activated by the ethylene amine for fluid viscosity breaking according to an embodiment of the invention.

Breaking of a 0.54 weight percent zirconium-crosslinked CMHPG at 80° C. with 0.1 volume percent cumene hydroperoxide (LUPEROX CU90, 88% active) and TEPA activator. In this example, 200 µL of LUPEROX CU90 were added to 200 ml of a 0.54% CMHPG solution. To this solution, 300 µL of TEPA and 520 µL of a zirconium crosslinker complex were added. The crosslinked gel was then loaded on the rheometer and heated to 80° C. The rheometer curves seen in FIG. 6 show a rapid viscosity loss in less than one hour. In contrast, Example 3 of US 5447199 discloses 0.37 volume percent of neat cumene hydroperoxide were needed to break a 0.48 weight percent guar gel in 80 minutes at 52° C. (180° F.). The rheometer curve of FIG. 6 for the TEPA-only, no peroxide base case also demonstrates that TEPA by itself results in no effective breaking of the fluid viscosity.

Example 7

Figure 7:
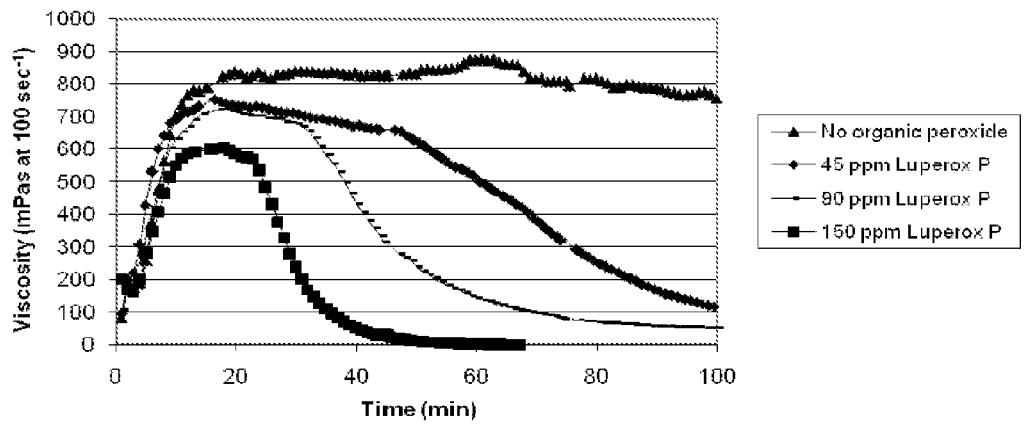
FIG. 7 shows rheometry curves at 80° C. for 0.54 weight percent zirconium-crosslinked CMHPG and 0.15 volume percent TEPA with 0, 45, 90 and 150 ppm t-butyl peroxybenzoate as described in Example 7, and demonstrates that the break time can be controlled by adjusting the proportion of the peroxyester according to an embodiment of the invention.

Concentration effectiveness of 0-150 ppm t-butyl peroxybenzoate for breaking 0.96% CMHPG at 80° C. with 0.15 volume percent TEPA. A 0.54 weight percent CMHPG solution was crosslinked using a zirconium crosslinker, and included 0.15% (vol) of tetraethylenepentamine. Using the same procedure of Example 2 with 0, 45, 90 and 150 ppm of the peroxyester, it was found that break kinetics could be controlled by adjusting the peroxyester concentration. The results are shown in FIG. 7. Taking complete break as a viscosity of 100 mPa-s or less at 100 1/second, at 45 ppm LUPEROX P the fluid viscosity was broken at about 100 minutes; at 90 ppm, broken at about 70 minutes; and at 150 ppm at about 35 minutes. Thus, the rate of fluid viscosity loss was controlled by varying the proportion of peroxide used.

Example 8

Figure 8:
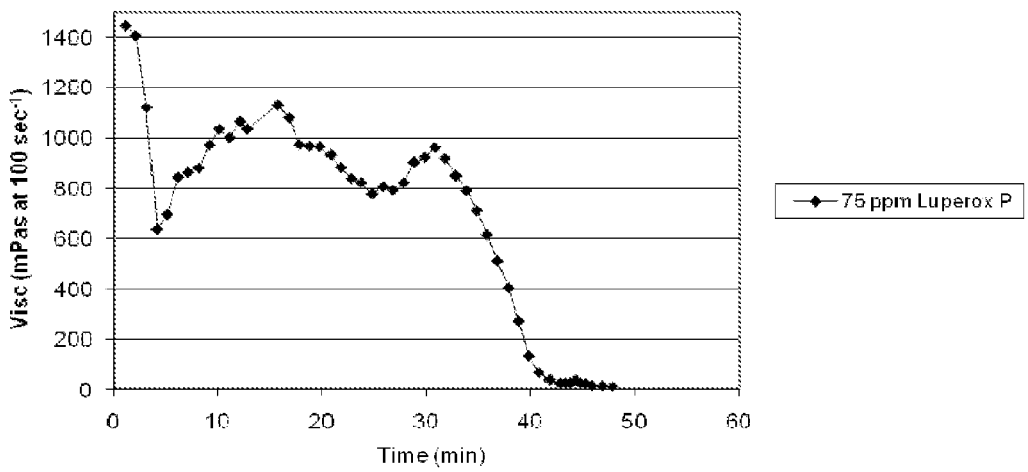
FIG. 8 shows a rheometry curve at 80° C. for 0.36 weight percent boron-crosslinked guar and with 75 ppm t-butyl peroxybenzoate (from 3 wt % LUPEROX P in ESCAID) and 0.15 volume percent TEPA as described in Example 8, according to an embodiment of the invention.

Breaking boron-crosslinked guar gel with 75 ppm t-butyl peroxybenzoate and 0.15 volume percent TEPA activator. A guar solution was made by adding 1.8 g guar powder to 500 mL of deionized water while mixing in a WARING blender. After blending for 30 minutes, 0.75 mL TEPA, 1.25 mL of 3 weight percent LUPEROX P in ESCAID 110, 0.23 ml of 30 weight percent sodium hydroxide solution, and 1.5 mL of borax in glycerine were added with a micropipette. The final boron concentration was 60 ppm, and the gel pH was 11.0. This crosslinked gel was added to the Grace M5500 rheometer, and tested at 80° C. as in Example 1. The fluid showed normal, unbroken viscosity until about 30 minutes, at which time viscosity loss commenced and the fluid was rapidly broken, as seen in FIG. 8.

Example 9

Figure 9:
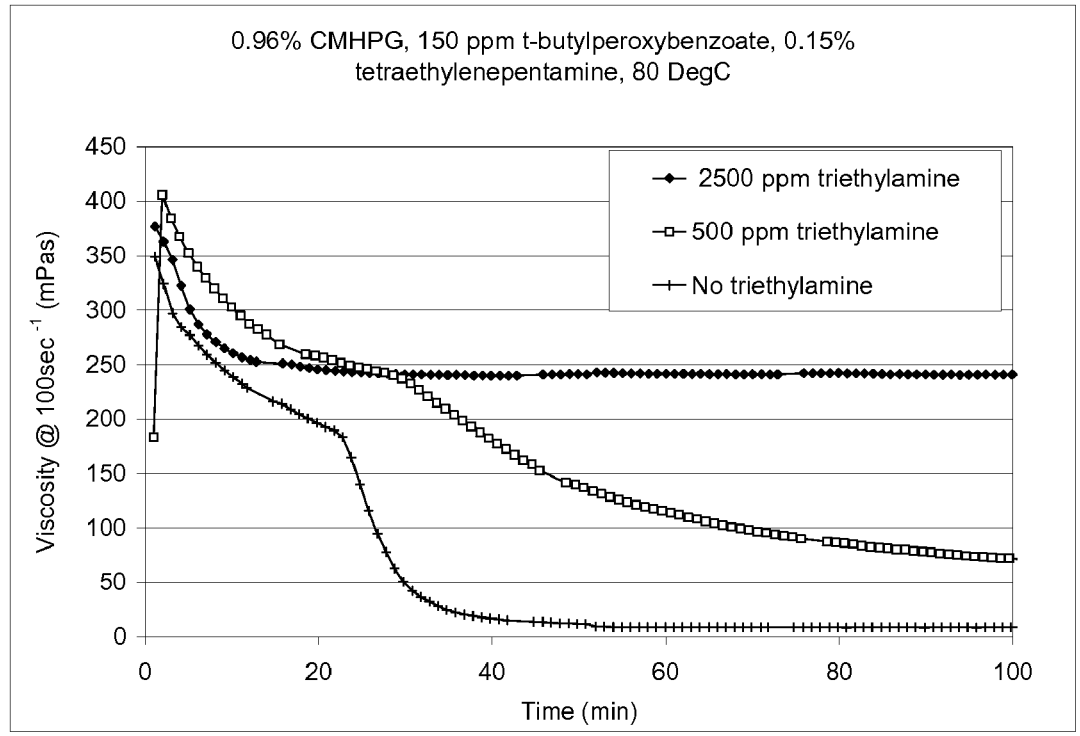
FIG. 9 shows rheometry curves at 80° C. for 0.96 weight percent CMHPG with 150 ppm t-butyl peroxybenzoate, 0.15 volume percent TEPA and 0, 500 and 2500 ppm triethylamine, and demonstrates that the fluid viscosity break can be controllably delayed by a simple amine as described in Example 9, according to an embodiment of the invention.

Peroxide-ethylene amine break delay at 80° C. with 0-2500 ppm triethylamine. A 0.96 weight percent solution of CMHPG was prepared with 0.15 volume percent TEPA, LUPEROX P from a 3% solution in ESCAID 110 to a final concentration of 150 ppm, and 0, 500 and 2500 ppm triethylamine. The rheology curves presented in FIG. 9 show that a simple amine such as a tertiary alkylamine can be added at concentrations to delay the break or fully inhibit viscosity loss. At 500 ppm triethylamine, the break was delayed by about 30-40 minutes, but at 2500 ppm, the triethylamine did not allow breaking to occur in the time of the test. It was unexpected that the use of a simple amine would controllably delay the peroxide break, especially because the ethyleneamines were found to be potent activators for peroxide-mediated breaking.

Example 10

Figure 10:
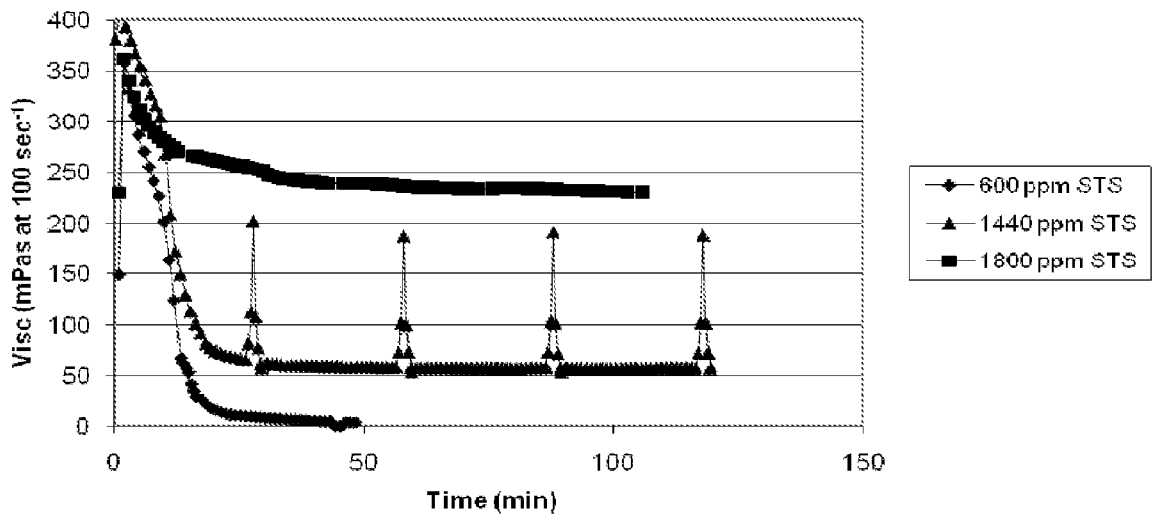
FIG. 10 shows rheometry curves at 80° C. for 0.96 weight percent CMHPG with 43 ppm t-butyl hydroperoxide, 0. 1 volume percent TEPA and 600, 1440 or 1800 ppm sodium thiosulfate pentahydrate (STS), and demonstrates that the stabilizers such as STS can effectively quench the breaker, as described in Example 10, according to an embodiment of the invention.

Peroxide-ethyleneamine breaker inhibition at 80° C. with sodium thiosulfate pentahydrate (STS). A 0.96 weight percent solution of CMHPG was prepared with 0.15 volume percent TEPA and 43 ppm t-butyl hydroperoxide, and 600, 1440 or 1800 ppm STS. As seen in the rheology curves of FIG. 10, a compound such as STS that is routinely used to stabilize polymer gel solutions from degradation, can fully inhibit the action of the organic peroxide. The results clearly show that 1800 ppm fully inhibited the action of the organic peroxide, whereas the lower concentrations of STS below the threshold minimum concentration had virtually no effect.

Example 11

Figure 11:
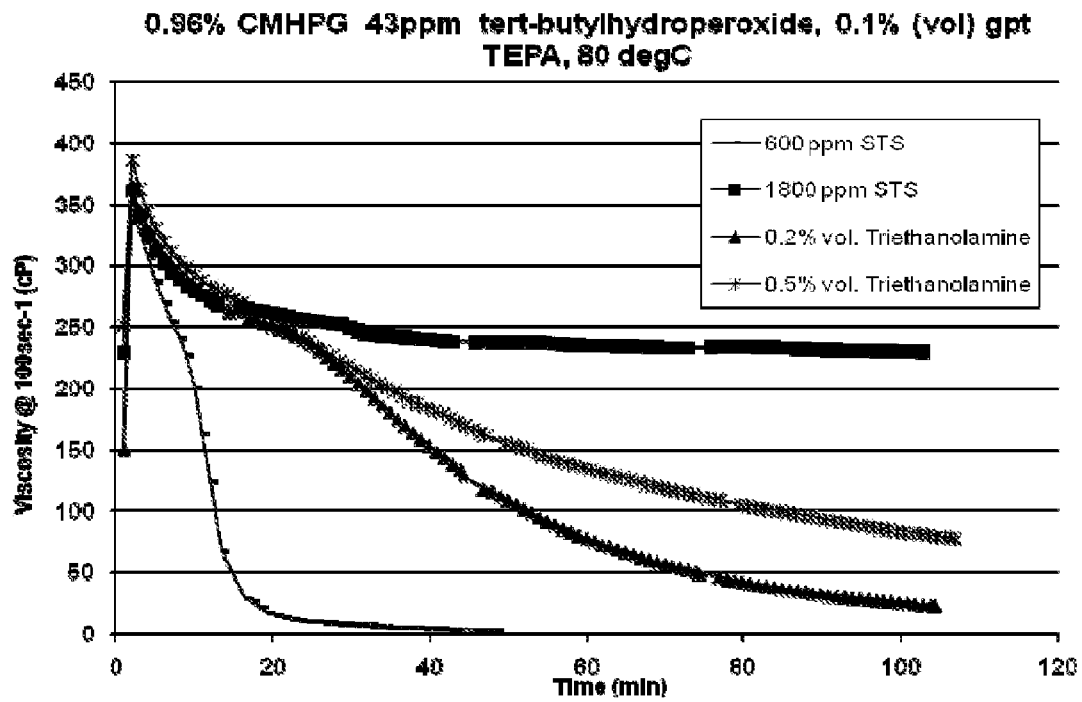
FIG. 11 shows rheometry curves at 80° C. for 0.96 weight percent CMHPG with 43 ppm t-butyl hydroperoxide, 0.1 volume percent TEPA and 600 or 1800 ppm STS or 0.2 or 0.5 volume percent triethanolamine, and demonstrates that the peroxide-ethyleneamine break package can be controllably delayed with a simple amine, whereas stabilizers effectively quench the breaker, as described in Example 11, according to an embodiment of the invention.

Controllability with concentrations of delay agents versus stabilizers. A 0.96 weight percent solution of CMHPG was prepared with 0.15 volume percent TEPA and 43 ppm t-butyl hydroperoxide, and either 600 or 1800 ppm STS or 0.2 or 0.5 volume percent triethanolamine. As seen in the rheology curves of FIG. 11, a compound such as STS that is routinely used to stabilize polymer gel solutions from degradation, either fully inhibits the action of the organic peroxide or has virtually no effect; the transition from an inactive inhibitor concentration to an inhibiting concentration is too distinct to use as an effective control for the break window. On the other hand, the concentration of a simple hydroxyalkylamine such as triethanolamine can be adjusted to control the break time to a desired window. A 2.5 fold increase in triethanolamine increased the break delay from about 50 minutes to about 85 minutes, taking the break time as the 100 mPa-s time, whereas a 3-fold increase in STS levels went from no delay at 600 ppm to full inhibition at 1800 ppm.

Example 12

Figure 12:
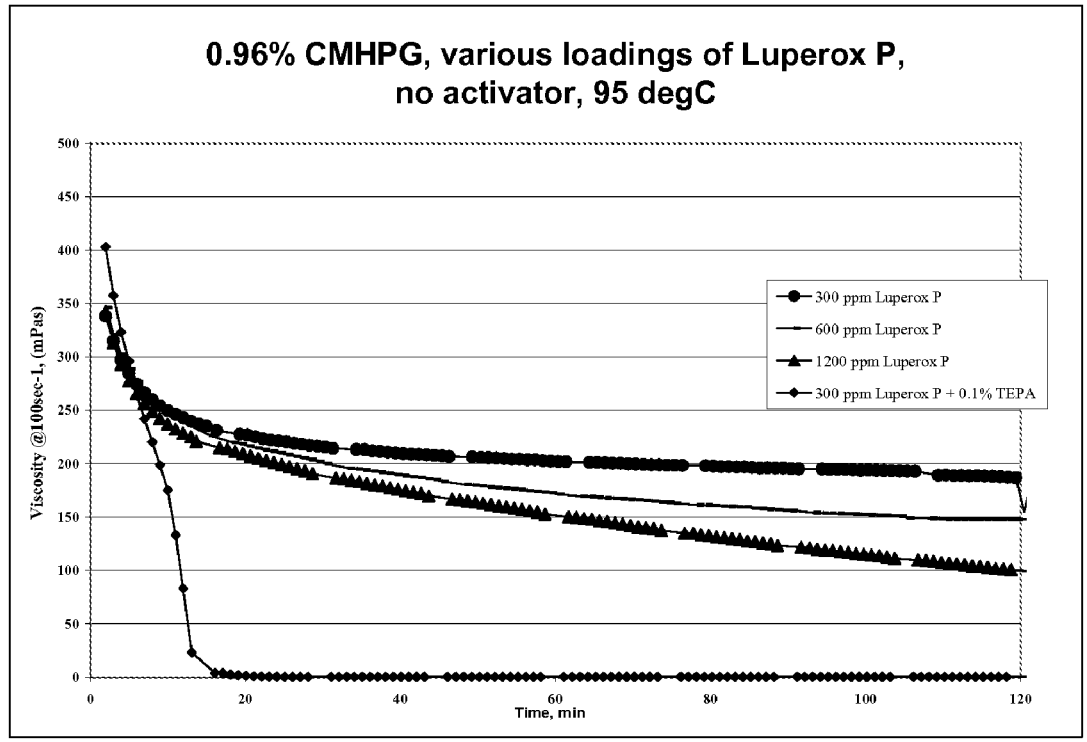
FIG. 12 shows rheometry curves at 95° C. for 0.96 weight percent CMHPG with 300, 600 and 1200 ppm t-butyl peroxybenzoate alone without ethyleneamine, and with both 300 ppm t-butyl peroxybenzoate and 0. 1 volume percent TEPA, and demonstrates that the ethyleneamine activator effectively reduces the required concentration of peroxide, as described in Example 12, according to an embodiment of the invention.

Use of activator to lower an effective concentration of the peroxide to break the fluid. A 0.96 weight percent solution of CMHPG was prepared in 2% KCl brine. The polymer was allowed to hydrate for 30 minutes with blending, and then split into 4 parts. Various loadings, viz. 300, 600 and 1200 ppm, of t-butyl peroxybenzoate supplied as LUPEROX PXL (50% active peroxide) were added to the fluid samples. No additional activator was added to the first three samples, while TEPA was added to the remaining sample at 0.1 volume percent. After stirring for about a minute in the WARING blender the samples of the fluid were loaded into a Grace M5500 rheometer, and tested at 95° C. The results are presented in FIG. 12. At the low concentration (300 ppm), the peroxyester without any ethyleneamine had a minimal effect on viscosity if at all; at increasing concentrations (600 and 1200 ppm) the peroxyester began to slowly reduce the break time, namely to about 2 hours at 1200 ppm peroxide. The presence of the TEPA, however, lowered the effective concentration to 300 ppm or less. Surprisingly, with the appropriate selection of activator and delay agent, the use of peroxide as a break mechanism can be controllably used at very low concentrations and at a substantial cost savings.

Example 13

Figure 13:
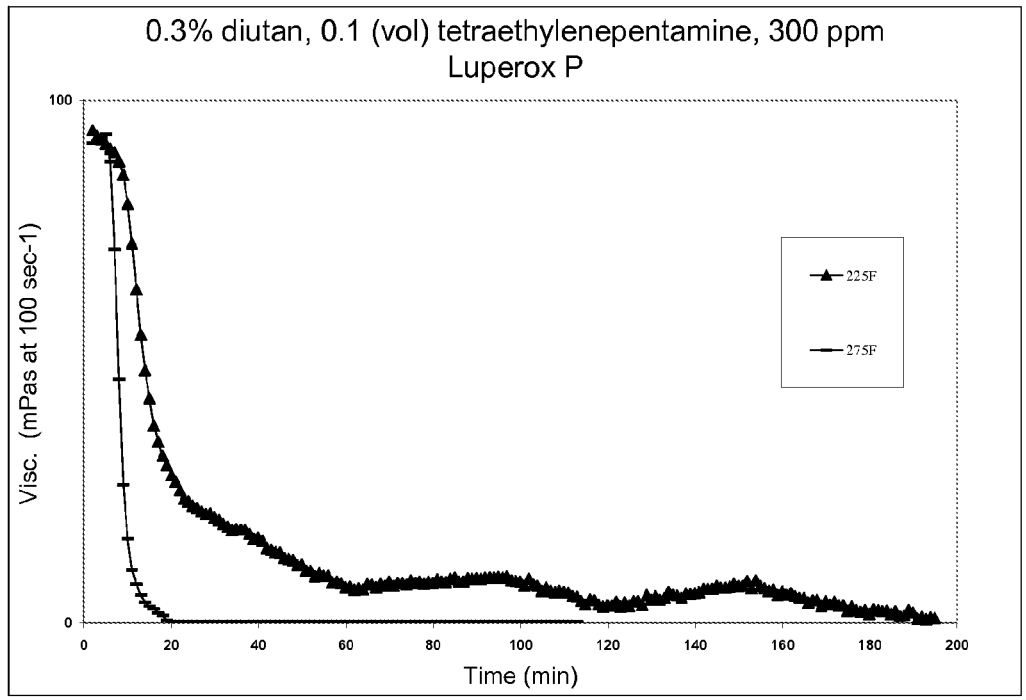
FIG. 13 shows rheometry curves at 105° C. and 135° C. for 0.3 weight percent diutan gel with 300 ppm t-butyl peroxybenzoate and 0.1 volume percent TEPA activator, and demonstrates effective breaking of diutan with a low concentration of the t-alkyl ester of a peroxycarboxylic acid activated with an ethyleneamine, as described in Example 13, according to an embodiment of the invention.

Breaking diutan gel with 300 ppm t-butyl peroxybenzoate and 0.1 volume percent TEPA activator. A 0.3 weight percent solution of diutan was prepared in 2% KCl brine. The polymer was allowed to hydrate for 30 minutes with blending, and then TEPA was added to the fluid at 0.1 volume percent followed by 300 ppm of t-butyl peroxybenzoate supplied as LUPEROX PXL (50% active peroxide). After stirring for about a minute in the WARING blender two samples of the fluid were loaded into a Grace M5500 rheometer, and tested at 105° C. and 135° C. The results are presented in FIG. 13. The TEPA-activated t-alkyl ester of the peroxycarboxylic acid demonstrated temperature-sensitive breaking of diutan at the 300 ppm peroxide concentration under 20 minutes in the range of temperatures tested.

Example 14

Figure 14:
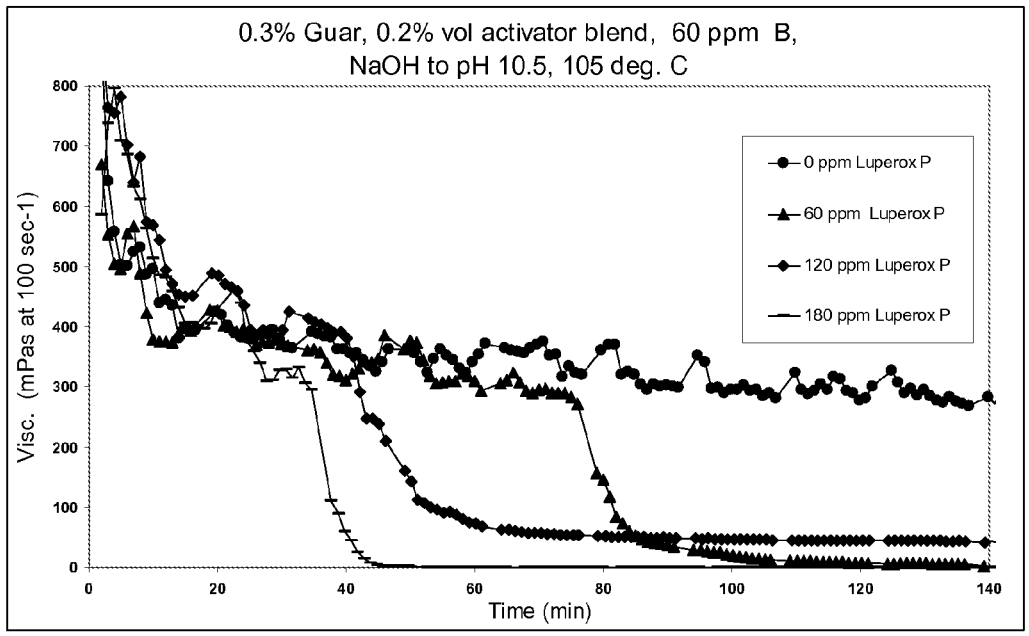
FIG. 14 shows rheometry curves at 105° C. and pH 10.5 for 0.3 weight percent boron-crosslinked guar gel with various levels of 0-180 ppm t-butyl peroxybenzoate and 0.2 volume percent of an aqueous blend of 10 weight percent TEPA activator and 40 weight percent triethanolamine, as described in Example 14, and demonstrates the use of an activator and a delay agent in combination to achieve the desired breaking time according to an embodiment.

Breaking boron-crosslinked guar with a peroxyester and a combination of ethyleneamine activator and triethanolamine delay agent. In this example, the TEPA and triethanolamine were blended together at 10 weight percent TEPA and 40 weight percent triethanolamine in 50 weight percent deionized (DI) water. A 0.3 weight percent solution of guar was prepared in 2% KCl brine. The polymer was allowed to hydrate for 30 minutes with blending, and then the TEPA/delay agent blend was added to the fluid at 0.2 volume percent. The base fluid was split into four parts, and 0, 60, 120 or 180 ppm of LUPEROX PXL t-butyl peroxybenzoate were added to each, followed by boron crosslinker to provide 60 ppm boron and NaOH to adjust the pH to approximately 10.5. The samples were loaded into a Grace M5500 rheometer, and tested at 105° C. The results are presented in FIG. 14. As shown, the activator and delay agent were effectively used in combination to achieve the desired breaking time. At a constant activator/delay agent blend concentration, the peroxyester concentration could be used as a control to adjust the desired break time, e.g., using more organic peroxide to lower the break time.

Example 15

Figure 15:
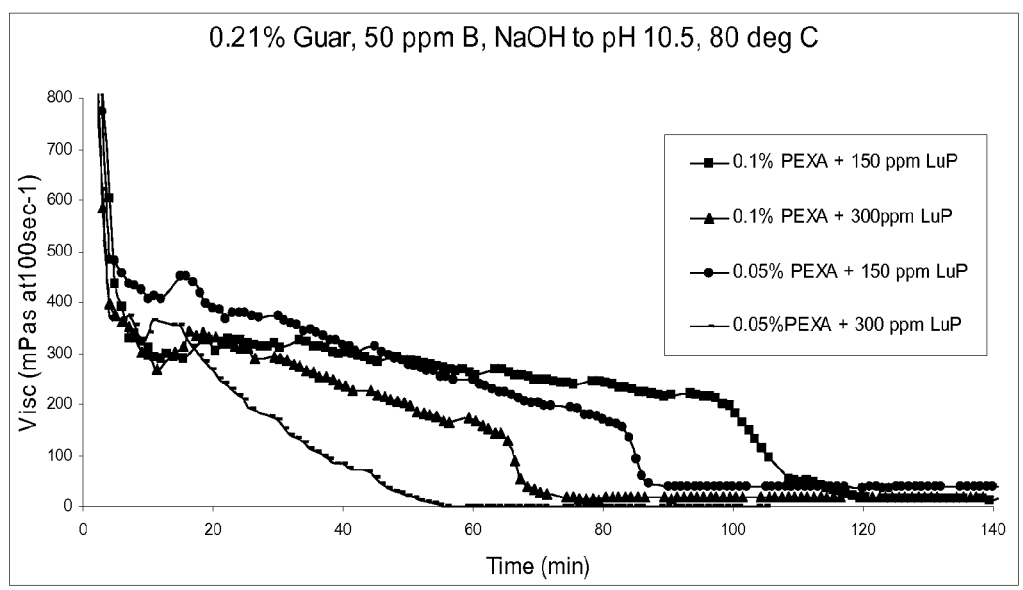
FIG. 15 shows rheometry curves at 80° C. and pH 10.5 for 0.21 weight percent boron-crosslinked guar gel with either 150 or 300 ppm t-butyl peroxybenzoate and either 0.05 or 0.1 volume percent of PEHA activator, as described in Example 15, and demonstrates a delay-sloped control region for the concentration of activator to achieve the desired breaking time (more activator surprisingly results in a longer breaking time) according to an embodiment.

Breaking boron-crosslinked guar with a peroxyester and PEHA activator. A 0.21 weight percent solution of guar was prepared in 2% KCl brine. The polymer was allowed to hydrate for 30 minutes with blending, and split into four parts. Two different amounts of LUPEROX P t-butyl peroxybenzoate (150 or 300 ppm) were added in combination with two different amounts of PEHA (0.05 or 0.1 volume percent), followed by boron crosslinker to provide 60 ppm boron and NaOH to adjust the pH to approximately 10.5. The samples were loaded into a Grace M5500 rheometer, and tested at 80° C. The results are presented in FIG. 15. As shown, the breaking time could be effectively controlled by adjusting the concentration of either one or both of the activator and peroxide. Increasing the proportion of the peroxide while holding the PEHA concentration level resulted in faster breaking times; however, it was found that increasing the PEHA activator concentration in the proportions tested surprisingly resulted in an increased breaking time. This result suggests that at certain ethyleneamine concentrations excessive amounts of the activator can provide a modicum of delay agent functionality.

The preceding description of specific embodiments of the present invention is not intended to be a complete list of every possible embodiment of the invention. Persons skilled in this field will recognize that modifications can be made to the specific embodiments described here that would be within the scope of the present invention.

We claim:

1. A well treatment method, comprising:
   introducing into the well an aqueous treatment fluid comprising a polysaccharide, a crosslinker, an organic peroxide, a soluble amine compound and a functional break delay agent;
   wherein the soluble amine compound has the $R^3R^4N((CR^5R^6)_2-NR^7)_n-R^8$ wherein n is from 2 to 8 and wherein $R^3$, $R^4$, $R^5$, $R^6$, $R^7$ and $R^8$ are independently selected from hydrogen, alkyl, hydroxyalkyl, and combinations thereof;
   wherein a weight ratio of the soluble amine to organic peroxide is from about 1:1 to about 20:1; and,
   breaking the treatment fluid.

2. The method of claim 1 wherein the peroxide comprises peroxyester and the functional break delay agent comprises at least one of triethylamine and triethanolamine.

3. The method of claim 1 comprising fracturing a subterranean formation penetrated by the well, contacting the formation with the treatment fluid and breaking the treatment fluid in the formation.

4. A well treatment method, comprising:
   introducing an aqueous treatment fluid comprising a viscosifying polymer into the well, and
   contacting the fluid with a breaker package comprising an organic peroxide and an activator to lower an effective concentration of the peroxide to break the fluid, wherein a weight ratio of the activator:organic peroxide is at least about 1:20, and wherein the organic peroxide comprises a peroxyester.

5. The method of claim 4 wherein polymer is crosslinked.

6. The method of claim 4 wherein the polymer is non-crosslinked.

7. The method of claim 4 wherein the polymer comprises polysaccharide.

8. The method of claim 4 wherein the polymer comprises a water soluble synthetic polymer.

9. The method of claim 4 wherein the organic peroxide is present at an effective concentration from about 1 to about 1200 ppm by weight of water in the treatment fluid.

10. The method of claim 4 wherein the organic peroxide is selected from the group consisting of diacyl peroxides, dialkyl peroxides, diperoxyketals, hydroperoxides, peroxydicarbonates, peroxyesters and combinations thereof.

11. The method of claim 4 wherein the organic peroxide is selected from the group consisting of t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids, OO-t-alkyl O-alkyl diesters of monoperoxycarbonic acids and combinations thereof.

12. The method of claim 4 wherein the organic peroxide comprises t-butyl peroxybenzoate.

13. The method of claim 4 wherein the organic peroxide is supported on a finely divided solid slurried in the treatment fluid.

14. The method of claim 4 wherein the activator comprises a polyamine according to the chemical formula $R^3R^4N((CR^5R^6)2-NR^7)_n-R^8$ wherein n is at least 2 and wherein $R^3$, $R^4$, $R^5$, $R^6$, $R^7$ and $R^8$ are independently selected from hydrogen, alkyl, hydroxyalkyl, and combinations thereof.

15. The method of claim 4 wherein the activator is selected from triethylenetetramine, tetraethylenepentamine, pentaethylenehexamine, N-methyl aniline, N,N-dimethyl aniline and combinations thereof.

16. The method of claim 4 wherein the weight ratio of activator:peroxide is from about 1:1 to about 20:1.

17. The method of claim 4 wherein the breaker package further comprises an onset delay agent.

18. The method of claim 4 wherein the breaker package further comprises an amine compound of the formula $RR^1NR^2$ wherein R, $R^1$, and $R^2$ are independently selected from hydrogen, alkyl, hydroxyalkyl, and combinations thereof.

19. The method of claim 4 wherein the breaker package further comprises triethylamine or triethanolamine.

20. The method of claim 4 wherein the treatment fluid comprises a stabilizer.

21. The method of claim 4 wherein the treatment fluid comprises sodium thiosulfate.

22. The method of claim 4 wherein the treatment comprises fracturing a formation penetrated by the well.

23. The method of claim 4 wherein the treatment fluid further comprises proppant.

24. The method of claim 4 wherein the breaker package is added to the treatment fluid before or during the introduction into the well.

25. The method of claim 4 wherein the breaker package is injected into a formation penetrated by the well in a separate fluid stage to mix with the treatment fluid in the formation.

26. The method of claim 4 wherein the breaker package is injected into the well in a separate fluid stage after the treatment fluid to initiate the contact in the well or in a formation penetrated by the well.

27. The method of claim 4 wherein the polymer is broken in a window from about 5 minutes up to less than about 150 minutes following the contact.

28. A well treatment method, comprising:
introducing an aqueous treatment fluid comprising a viscosifying polymer into the well, and
contacting the polymer with a peroxyester effective to break the fluid viscosity.

29. A well treatment method, comprising:
designing a well treatment job with a specified window to break an aqueous treatment fluid;
wherein the aqueous treatment fluid comprises a viscosifying polymer, an organic peroxide breaker and a delay agent to controllably delay the breaker;
adjusting a proportion of the peroxide breaker, delay agent or combination thereof in the treatment fluid to control the polymer break window to match the specified break window; and
introducing the aqueous treatment fluid into the well according to the treatment job design.

30. A well treatment method, comprising:
introducing an aqueous treatment fluid comprising a viscosifying polymer into the well, and
contacting the polymer with a breaker package comprising an organic peroxide and a breaker delay agent, wherein the delay agent has the formula $RR^1NR^2$ wherein R, $R^1$, and $R^2$ are independently selected from hydrogen, alkyl, hydroxyalkyl, and combinations thereof.

31. A well treatment method, comprising:
introducing an aqueous treatment fluid comprising a viscosifying polymer into the well, and
contacting the fluid with a breaker package comprising an organic peroxide and an activator to lower an effective concentration of the peroxide to break the fluid, wherein the weight ratio of activator:peroxide is from about 1:1 to about 20:1.

32. A well treatment method, comprising:
introducing an aqueous treatment fluid comprising a viscosifying polymer and a stabilizer into the well, and
contacting the fluid with a breaker package comprising an organic peroxide and an activator to lower an effective concentration of the peroxide to break the fluid, wherein a weight ratio of the activator:organic peroxide is at least about 1:20.

33. A well treatment method, comprising:
introducing an aqueous treatment fluid comprising a viscosifying polymer into the well, and
contacting the fluid with a breaker package comprising an organic peroxide and an activator to lower an effective concentration of the peroxide to break the fluid, wherein a weight ratio of the activator:organic peroxide is at least about 1:20,
wherein the polymer is broken in a window from about 5 minutes up to less than about 150 minutes following the contact.

* * * * *